(12) United States Patent
Hayakawa

(10) Patent No.: US 7,827,158 B2
(45) Date of Patent: Nov. 2, 2010

(54) INFORMATION PROCESSING APPARATUS, CONTENT PROCESSING METHOD, STORAGE MEDIUM, AND PROGRAM

(75) Inventor: Takeshi Hayakawa, Suginami-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 222 days.

(21) Appl. No.: 11/559,087

(22) Filed: Nov. 13, 2006

(65) Prior Publication Data

US 2008/0034020 A1 Feb. 7, 2008

(30) Foreign Application Priority Data

Nov. 14, 2005 (JP) ............................. 2005-328483

(51) Int. Cl.
G06F 17/00 (2006.01)
(52) U.S. Cl. ..................... 707/696; 707/688; 707/741; 707/748
(58) Field of Classification Search .................... None
See application file for complete search history.

(56) References Cited

U.S. PATENT DOCUMENTS

| | | | | |
|---|---|---|---|---|
| 3,670,310 | A * | 6/1972 | Bharwani et al. .................. | 1/1 |
| 5,983,231 | A * | 11/1999 | Minatogawa et al. ....... | 707/102 |
| 6,064,952 | A * | 5/2000 | Imanaka et al. ................ | 704/9 |
| 6,421,672 | B1 * | 7/2002 | McAllister et al. ............ | 707/10 |
| 6,571,239 | B1 * | 5/2003 | Cole et al. ...................... | 707/5 |
| 6,751,613 | B1 * | 6/2004 | Lee et al. ............................ | 1/1 |
| 6,845,486 | B2 * | 1/2005 | Yamada et al. .............. | 715/706 |
| 7,167,901 | B1 * | 1/2007 | Beadle et al. ............... | 709/207 |
| 2001/0037325 | A1 * | 11/2001 | Biderman et al. .............. | 707/1 |
| 2002/0041713 | A1 * | 4/2002 | Imagawa et al. ............ | 382/229 |
| 2002/0120712 | A1 * | 8/2002 | Maislin ...................... | 709/217 |
| 2003/0046281 | A1 * | 3/2003 | Son .................................. | 707/6 |
| 2003/0055831 | A1 * | 3/2003 | Ryan et al. ................ | 707/100 |
| 2003/0140038 | A1 * | 7/2003 | Baker et al. .................... | 707/3 |
| 2003/0163462 | A1 * | 8/2003 | Kawamura .................... | 707/3 |
| 2004/0249790 | A1 * | 12/2004 | Komamura ................... | 707/3 |
| 2005/0080764 | A1 * | 4/2005 | Ito ................................. | 707/1 |
| 2005/0144162 | A1 * | 6/2005 | Liang ............................ | 707/3 |
| 2005/0240579 | A1 * | 10/2005 | Sasai ............................ | 707/3 |
| 2006/0047649 | A1 * | 3/2006 | Liang ............................ | 707/4 |
| 2006/0287920 | A1 * | 12/2006 | Perkins et al. ................ | 705/14 |
| 2007/0050355 | A1 * | 3/2007 | Kim .............................. | 707/5 |
| 2007/0130117 | A1 * | 6/2007 | Lapstun et al. ................ | 707/2 |
| 2007/0136251 | A1 * | 6/2007 | Colledge et al. .............. | 707/3 |

FOREIGN PATENT DOCUMENTS

JP 7-239854 A 9/1995

* cited by examiner

Primary Examiner—Etienne P LeRoux
Assistant Examiner—Hung D Le
(74) Attorney, Agent, or Firm—Canon U.S.A., Inc. I.P. Division

(57) ABSTRACT

An information apparatus searches content that is stored in a database by using a search engine based on a newly input keyword; acquires a search operation history of the content that is acquired by the search engine via an operation history engine; and updates the keyword associated with the content that is registered in the database by collating the search operation history and the newly input keyword. While adding of the inappropriate search information (keyword) is prevented, the appropriate search information can be automatically updated and set to the content.

5 Claims, 27 Drawing Sheets

FIG.12

| ITEM NO. | RESULT |
|---|---|
| 1 | JULY 1: "TRAVEL" "SUMMER" WERE USED AS SEARCH KEYWORDS IN SEARCHING CONTENT A |
| 2 | JULY 20: "TRAVEL" "SEA" WERE USED AS SEARCH KEYWORDS IN SEARCHING CONTENT A |
| 3 | JULY 30: "TRAVEL" "OKINAWA" WERE USED AS SEARCH KEYWORDS IN SEARCHING CONTENT A |

FIG.19

| ITEM NO. | RESULT |
|---|---|
| 1 | JULY 1: "TRAVEL" "SUMMER" WERE USED AS SEARCH KEYWORDS IN SEARCHING CONTENT A |
| 2 | JULY 2: "TRAVEL" "SEA" WERE USED AS SEARCH KEYWORDS IN SEARCHING CONTENT A |
| 3 | JULY 10: "TRAVEL" "SUMMER" WERE USED AS SEARCH KEYWORDS IN SEARCHING CONTENT A |
| 4 | JULY 11: "TRAVEL" "SUMMER" "SEA" WERE USED AS SEARCH KEYWORDS IN SEARCHING CONTENT A |
| 5 | JULY 12: "TRAVEL" "WESTERN JAPAN" WERE USED AS SEARCH KEYWORDS IN SEARCHING CONTENT A |
| 6 | JULY 20: "TRAVEL" "SUMMER" "WESTERN JAPAN" WERE USED AS SEARCH KEYWORDS IN SEARCHING CONTENT A |
| 7 | JULY 25: "TRAVEL" "SUMMER" WERE USED AS SEARCH KEYWORDS IN SEARCHING CONTENT A |

FIG.20

| ITEM NO. | KEYWORD ACQUIRED FROM HISTORY | |
|---|---|---|
| 1 | TRAVEL | SEVEN TIMES |
| 2 | SUMMER | FIVE TIMES |
| 3 | SEA | TWICE |
| 3 | WESTERN JAPAN | TWICE |

FIG.24

| ITEM NO. | RESULT |
|---|---|
| 1 | JULY 1: "TRAVEL" "SUMMER" WERE USED AS SEARCH KEYWORDS IN SEARCHING CONTENT A |
| 2 | JULY 2: "TRAVEL" "SEA" WERE USED AS SEARCH KEYWORDS IN SEARCHING CONTENT A |
| 3 | JULY 10: "SUMMER" "SEA" WERE USED AS SEARCH KEYWORDS IN SEARCHING CONTENT A |
| 4 | JULY 11: "TRAVEL" "SUMMER" "BEAUTIFUL" WERE USED AS SEARCH KEYWORDS IN SEARCHING CONTENT A |
| 5 | JULY 12: "SUMMER" "SEA" WERE USED AS SEARCH KEYWORDS IN SEARCHING CONTENT A |

FIG.25

| ITEM NO. | KEYWORD ACQUIRED FROM HISTORY | |
|---|---|---|
| 1 | TRAVEL | THREE TIMES |
| 2 | SUMMER | THREE TIMES |
| 3 | SEA | THREE TIMES |
| 3 | BEAUTIFUL | ONCE |

FIG.27

STORAGE MEDIUM SUCH AS FD/CD-ROM

| DIRECTORY INFORMATION |
|---|
| DATA PROCESSING PROGRAM<br>GROUP OF PROGRAM CODE CORRESPONDING TO EACH STEP OF FLOW CHART OF FIG. 4 |
| DATA PROCESSING PROGRAM<br>GROUP OF PROGRAM CODE CORRESPONDING TO EACH STEP OF FLOW CHART OF FIG. 5 |
| DATA PROCESSING PROGRAM<br>GROUP OF PROGRAM CODE CORRESPONDING TO EACH STEP OF FLOW CHART OF FIG. 6 |
| DATA PROCESSING PROGRAM<br>GROUP OF PROGRAM CODE CORRESPONDING TO EACH STEP OF FLOW CHART OF FIG. 7 |
| DATA PROCESSING PROGRAM<br>GROUP OF PROGRAM CODE CORRESPONDING TO EACH STEP OF FLOW CHART OF FIG. 17 |
| DATA PROCESSING PROGRAM<br>GROUP OF PROGRAM CODE CORRESPONDING TO EACH STEP OF FLOW CHART OF FIG. 21 |
| |

MEMORY MAP IN STORAGE MEDIUM

INFORMATION PROCESSING APPARATUS, CONTENT PROCESSING METHOD, STORAGE MEDIUM, AND PROGRAM

BACKGROUND OF THE INVENTION

1. Field of the Invention

The present invention relates to an information processing apparatus that searches and processes stored content.

2. Description of the Related Art

A number of various kinds of systems that store a vast amount of electronic contents (such as a document and an image) so as to reuse the content are proposed in response to recent developments of network environments. In this regard, a function for searching for desired content is necessary under the network environment. Thus, a very strong full-text search type search engine is proposed which can search contents including a large number of search objects.

For example, there is a search site (search system) for searching for an HTML document on the Web.

In most cases, such a search system or search engine uses a keyword search. A keyword is previously linked to a content to be searched. What is important here is which word is set as the keyword.

In some cases, besides a word, a sentence and a character can be used as a keyword.

Because a plurality of different keywords can be set for one content, the keyword needs to be user-friendly by using a term having a broad meaning and a term having a narrow meaning in combination.

In addition, contents that are not utilized and contents to which an inappropriate keyword is set, need to be cleaned up by maintenance work.

Further, in some cases, a function for automatically adding a keyword to a content is used. In this regard, Japanese Laid-Open Patent Application No. 07-239854 discusses a technique in which date and time and a page number concerning an operation performed to a content can be used as a search keyword.

However, in a case of using the function for automatically adding a keyword, the keyword that is added is sometimes inappropriate.

For example, in a case where search keywords that a user has used in combination at the search operation are added to a concerned content, the content may not be significantly related to the added keywords.

In most cases, the function for automatically adding a keyword does not include a function for determining whether the added keywords are appropriate. Accordingly, many keywords can be set to one content or an inappropriate keyword is undesirably set to a content. Therefore, how to find an appropriate keyword automatically is a major challenge for the search system.

In addition, in deleting an inappropriate keyword or adding an appropriate keyword according to a content search result, it is not sufficiently examined whether the keyword is appropriate or inappropriate. Accordingly, an appropriate keyword can be undesirably deleted at the time of deleting a keyword, or an inappropriate (unnecessary) keyword can be undesirably added.

SUMMARY OF THE INVENTION

The present invention is directed to preventing adding an inappropriate keyword to a content registered in a database. The present invention is also directed to providing a method for automatically updating and setting appropriate search information to a content by processing a search request to the content.

According to an aspect of the present invention, an information processing apparatus that searches in a storage that stores contents with keywords, the apparatus includes: a searching unit configured to search the content that is stored in the storage based on an input search keyword; a storing unit configured to store a search history of the content stored in the storage that is performed by the searching unit; and an updating unit configured to update the keyword associated with the content that is stored in the storage by comparing a new search result by the searching unit with the search result that is stored in the storing unit.

According to another aspect of the present invention, a method of processing content in an information processing apparatus that comprises a storage that stores contents with keywords, the method includes: searching the content that is stored in the storage based on an input search keyword; storing a search history of the content stored in the storage that is performed; and updating the keyword associated with the content that is stored in the storage by comparing a new search result by the searching step with the search result stored by the storing step.

According to exemplary embodiments of the present invention, when content that is stored based on a search condition that is set is searched, an operation history for the searched content that is acquired by execution of the search is utilized. Accordingly, a case where inappropriate information is added is prevented from occurring and appropriate search information can be automatically updated and set to the content.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 12 illustrates one example of the data of a search result about the operation history that is received from an operation history engine as shown in FIG. 3.

FIG. 19 illustrates one example of the data of a search result about the operation history received from the operation history engine as shown in FIG. 3.

FIG. 20 illustrates one example of the data stored in the storage medium in the web APS as shown in FIG. 1.

FIG. 24 illustrates one example of the data of the search result about the operation history that is received from the operation history engine as shown in FIG. 3.

FIG. 25 illustrates one example of the data stored in the storage medium in the web APS as shown in FIG. 1.

FIG. 27 illustrates a memory map of a storage medium that stores various data processing programs that the server of the present invention can read.

DETAILED DESCRIPTION OF THE EMBODIMENTS

Various exemplary embodiments, features, and aspects of the invention will be described in detail below with reference to the drawings. It should be noted that the relative arrangement of the components, the numerical expressions and numerical values set forth in these embodiments do not limit the scope of the present invention unless it is specifically stated otherwise.

First Exemplary Embodiment

Figure 1:
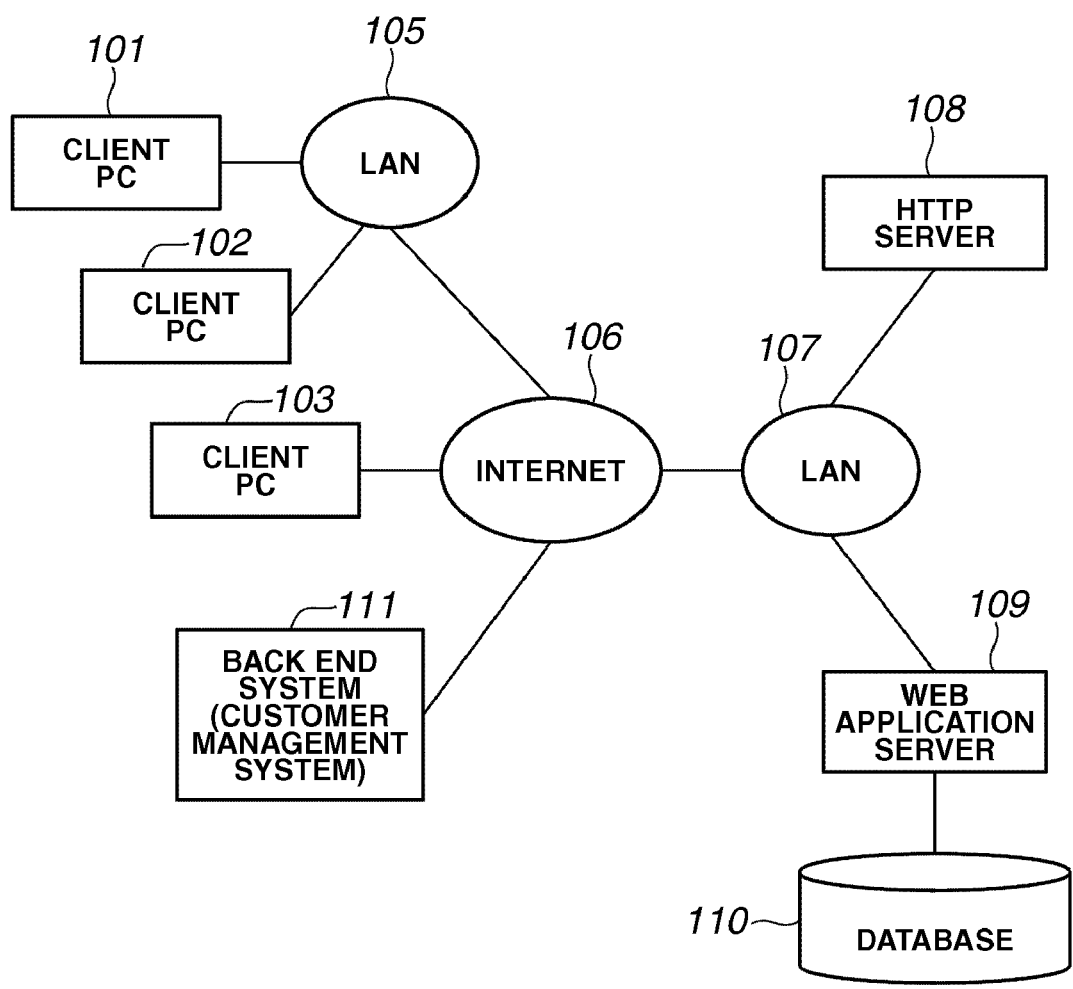
FIG. 1 illustrates an example of a data processing system according to a first exemplary embodiment of the present invention.

FIG. 1 illustrates an example of a data processing system according to a first exemplary embodiment of the present invention. The data processing system according to this exemplary embodiment is a system for browsing information content.

In this exemplary embodiment, the content refers to electronic data that an information processing apparatus can handle, such as document data, image data, text data, music data, and graphic data.

Accordingly, a type of a content that is handled differs according to a kind of system that is actually used. For example, in a music distribution system, main contents are a music file and document data that is collateral with the music file. In a catalog production system, main contents are image data and text data.

Referring to FIG. 1, the data processing system includes client personal computers (PCs) 101, 102, and 103, an hyper text transfer protocol (HTTP) server (web server) 108, and a web application server (web APS) 109.

Each of the client PCs 101, 102, and 103 is a computer that uses a web browser so as to communicate using HTTP. The client PCs 101, 102, and 103 are respectively configured by a personal computer that is used by a system administrator to perform maintenance of content and to perform system maintenance such as a correction of user management information.

Local area networks (LANs) 105 and 107 and the Internet 106 represent a network that the data processing system uses. The client PCs 101 and 102, which are connected to the LAN 105, send and receive data to and from other devices via the LAN 105. The client PC 103 is directly connected to the Internet 106.

The HTTP server (web server) 108 receives a request sent by the client PCs 101, 102, and 103 using an HTTP protocol via the network. A plurality of web application servers are registered in the HTTP server 108. The HTTP server 108 distributes processing to an appropriate web application server according to a content of the request sent from the client PCs 101, 102, and 103. The server that receives the request, for example the web APS 109, performs the distributed processing and returns a result of the processing to the client PCs 101, 102, and 103.

A database 110 is connected to the web APS 109. Content data, data related to the content, information such as an operation history and a processing status, and system information including user/group information are recorded in the database 110.

The HTTP server 108, the web APS 109, and the database 110 are combined in a systematic manner so as to function as a web database system.

In this exemplary embodiment, a web page is described in hypertext markup language (HTML). However, the web page can be produced in a mark-up language that can describe a web page or a similar language.

The present invention can be readily applied to extensible hypertext markup language (XHTML), which is extensible markup language (XML) compliant. That is, the present invention can be effectively implemented regardless of page description language used in describing the web page. In addition, an advantage of the present invention can remain effective when a dynamic page production unit is used.

The web APS 109 is connected, for example, to a back end system (customer management system) 111 used by a company, via the LAN 107. In this exemplary embodiment, content data is utilized by the back end system 111. The back end system 111 can be directly connected to the web APS 109.

Figure 2:
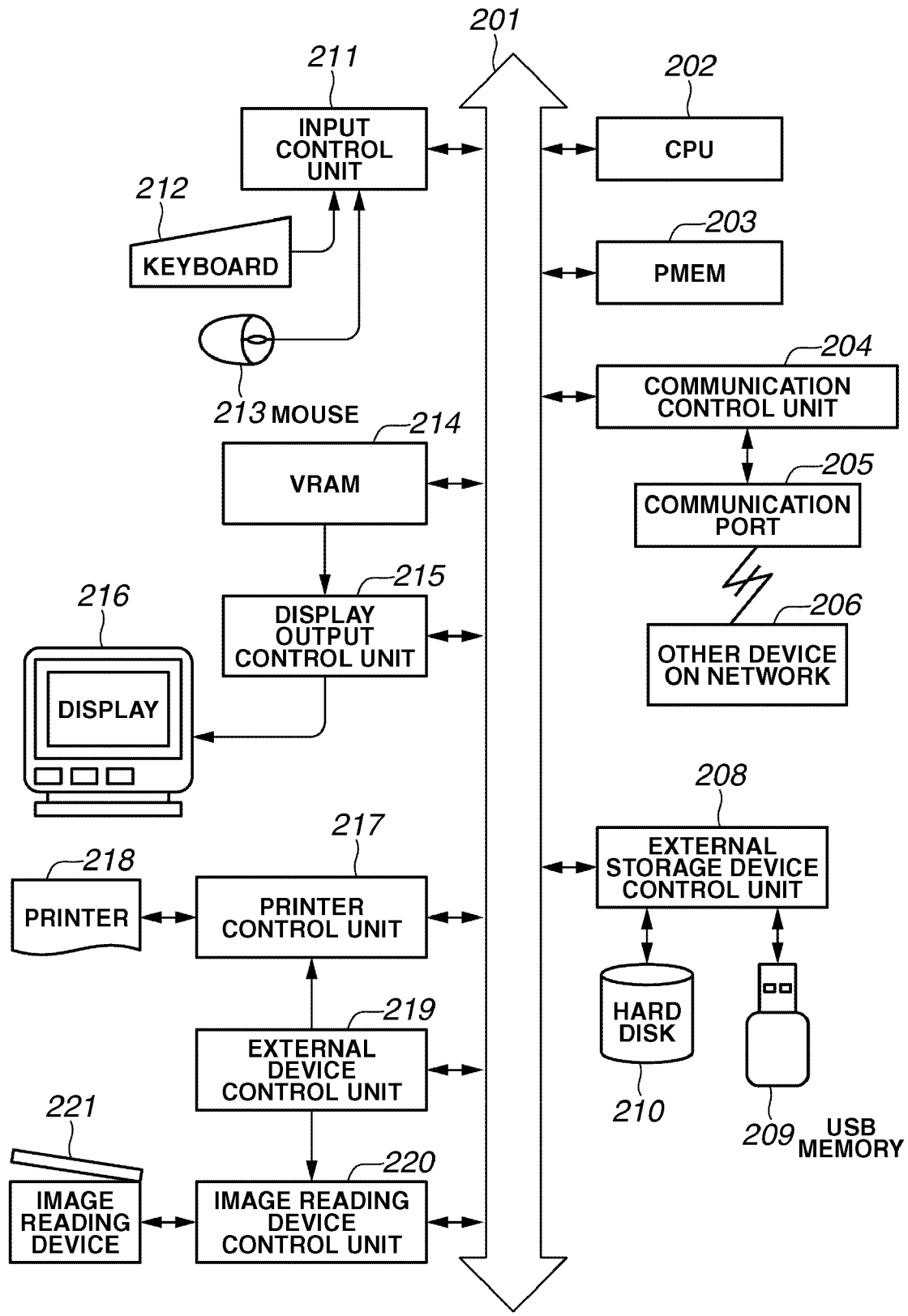
FIG. 2 illustrates a hardware configuration of a client PC, an HTTP server, and a web application server (web APS) as shown in FIG. 1.

FIG. 2 illustrates a hardware configuration of the client PCs 101, 102, and 103; the HTTP server 108; and the web APS 109, which are respectively shown in FIG. 1.

A central processing unit (CPU) 202 and a program memory (PMEM) 203 are connected to the system bus 201. A communication control unit 204, an external storage device control unit 208, an input control unit 211, and a video image memory (VRAM) 214 are connected to the system bus 201.

Further, a display output control unit 215, a printer control unit 217, an external device control unit 219, and an image reading device control unit 220 are connected to the system bus 201.

The communication control unit 204 controls data that is input and output through a communication port 205. A signal that is output through the communication port 205 is transmitted to a communication port of other devices 206 on the network, via a communication line.

The external storage device control unit 208 controls access to a disk for filing data such as a universal serial bus (USB) memory 209 and a hard disk (HD) 210.

Input devices such as a keyboard 212 and a mouse 213 are connected to the input control unit 211. An operator issues a command to operate the data processing system by manipulating the input device. A display 216 is connected to the video image memory (VRAM) 214 via the display output control unit 215. In the VRAM 214, data that is displayed by the display 216 is expanded as bitmap data.

By using the mouse 213 (i.e., a pointing device), the operator issues an instruction for processing image information on the display 216. The operator selects a command and an icon on a command menu by moving a cursor on the display 216 in a direction X and a direction Y. In addition to selecting the command and the icon, the operator uses the mouse 213 to indicate objects and text to be edited, and instruct a rendering position.

The PMEM 203 appropriately selects and reads a program for implementing the processing according to this exemplary embodiment from the hard disk 210 so as to allow the CPU 202 to implement the read program. Data input from the keyboard 212 is stored in the PMEM 203 (i.e., a text memory) as code information.

The printer control unit 217 controls data that is output to the printer 218 connected to the printer control unit 217. The image reading device control unit 220 is connected to the image reading device 221 so as to control the image reading device 221.

The external device control unit 219 controls an external device such as the printer 218 and the image reading device 221.

The client PCs 101, 102, and 103 according to this exemplary embodiment do not necessarily include constituent components such as the printer 218 that is directly connected to the client PC; the printer control unit 217; the image reading device control unit 220; and the image reading device 221.

In this exemplary embodiment, a network such as a LAN is described. However, the present invention can also be applied to a case where the communication port 205 connected to the communication control unit 204, and the communication line belong to a common public line.

The image reading device control unit 220 and the image reading device 221 can be separately configured. Further, if the image reading device control unit 220 includes the image reading device 221 and works as one component, the function of the image reading device control unit 220 and the image reading device 221 can be similarly implemented.

The program maintained in the PMEM 203 is stored in a storage medium such as a hard disk (HD) and/or a USB memory directly connected to the apparatus. Besides, the program maintained in the PMEM 203 can also be stored on another device connected via a network.

In the client PCs 101, 102, and 103, a general-purpose web browser (for example, Microsoft Internet Explorer®) is stored in a storage medium. The CPU 202 reads and executes a program of the web browser so as to implement a user interface of the present invention on the web browser.

Figure 3:
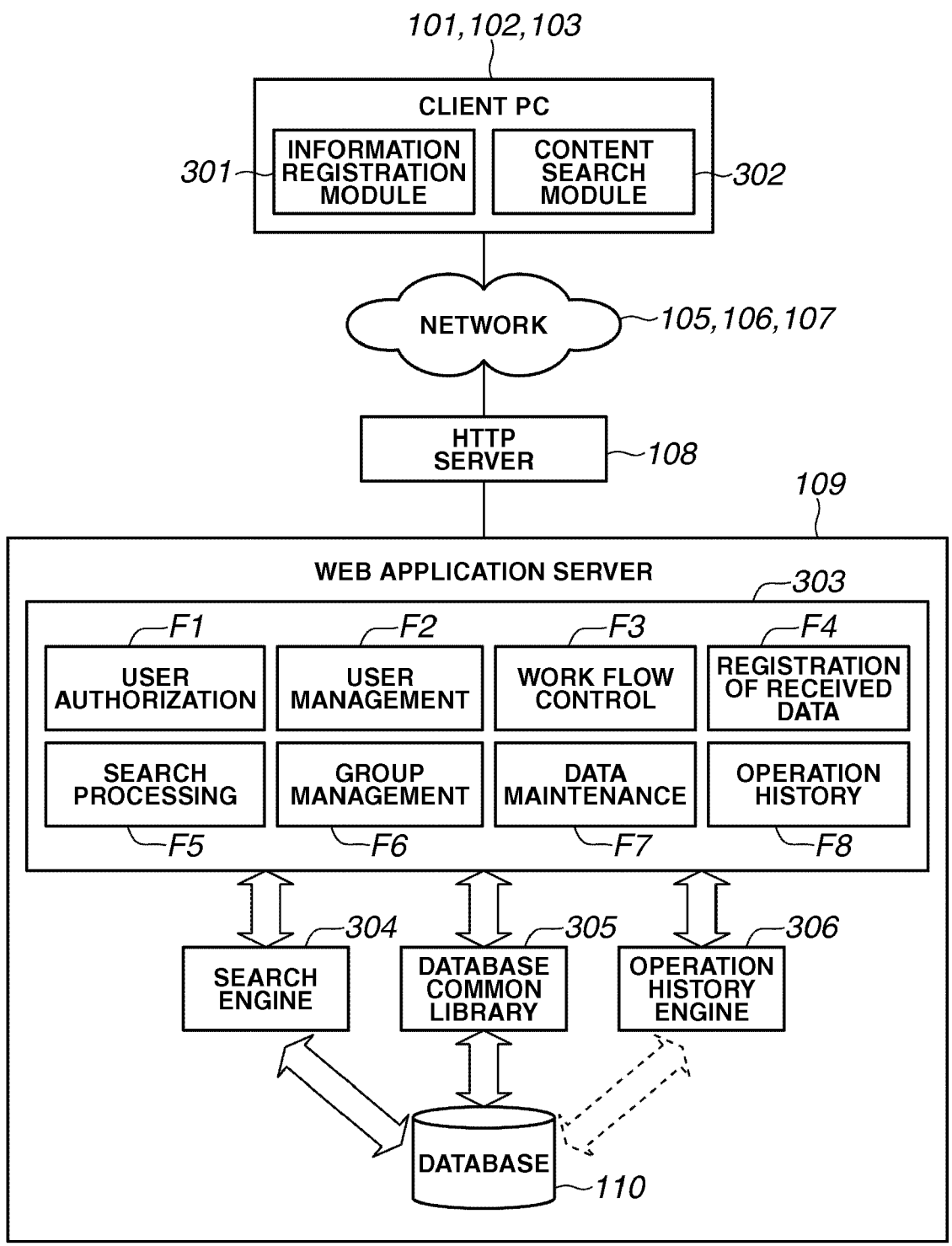
FIG. 3 illustrates a configuration of a module of each device in the data processing system as shown in FIG. 1.

FIG. 3 illustrates a configuration of a module of each device in the data processing system as shown in FIG. 1.

Referring to FIG. 3, the client PCs 101, 102, and 103 include an information registration module 301 and a content search module 302. The information registration module 301 registers content such as catalog information and image data in the web APS 109 via the HTTP server 108. The information registration module 301 also registers form information for outputting product data. The content search module 302 searches for a content that is necessary for producing a form.

The registration module 301 and the content search module 302 are stored in the hard disk 210 shown in FIG. 2 and loaded onto the PMEM 203 so as to be executed by the CPU 202.

The registration module 301 and the content search module 302 are automatically distributed as necessary from the web APS 109 in a plug-in format of the web browser. Accordingly, it is not necessary for the client PCs 101, 102, and 103 to perform installation processing.

The web APS 109 stores a module group 303 for processing requests from the client PCs 101, 102, and 103 that are received via the HTTP server 108.

The module group 303 includes various functions. For example, the module group 303 includes a user authorization function F1, a user management function F2, a work flow control function F3, a communication data registration function F4, a search processing function F5, a group management function F6, a data maintenance function F7, an operation history function F8, and a thumbnail production function (not shown).

The user authorization function F1 is a function for confirming an authority of a user at a time of log-in by the user. The user management function F2 is a function for registering and managing private information.

The work flow control function F3 is a function related to control of a work flow. The received data registration function F4 is a function related to registration of received document image data.

The search processing function F5 is a function related to a search such as a full-text search. The group management function F6 is a function for registering and managing a group to which a user belongs. The data maintenance function F7 is a function for setting data that is internally used, for example, used in a folder that stores data. The operation history function F8 is a function for recording an operation performed for each module so as to enable searching.

The module group 303 is loaded onto the PMEM 203 upon request from the client PCs 101, 102, and 103, and the processing is implemented. Besides the module group 303, the web APS 109 includes a database common library 305 for exchanging data with the database 110. Further, the web APS 109 includes an operation history engine 306 as a library for various utilities.

A function can be added to the module group 303 as necessary. The content search processing according to this exemplary embodiment is performed using a search engine 304.

In this exemplary embodiment, an engine refers to a mechanism, a program, and a process for allowing a computer to perform data processing. Terms such as "search engine" and "operation history search engine" are used for convenience. However, these terms collectively refer to a mechanism for performing given processing by reading and executing program code stored in a storage medium.

The search engine 304 exists in a layer below a layer in which the module group 303 exists. However, this relationship of layers is just an example. That is, the configuration can be such that a search engine exists in the same layer as the layer in which the module group 303 exists or that a search engine is included in a search processing module.

The search engine 304 refers to an engine that generally uses text data as input information for "full-text search", "text search", and "image search" so as to find content related to the text data.

In the full-text search and the text search, search can be performed about one or more specific components included in a document, such as a heading and a producer of the document or about all information included in a document. However, the engine can perform any of these searches. Alternatively, the engine can also use a similar but different method.

The image search refers to a caption of a content and surrounding text. Further, in the image search, the data that is used for the image search, can be previously collected. However, the engine can perform any of these searches. Alternatively, the engine can use a similar but different method.

In this exemplary embodiment, it is significant that the search engine 304 includes a function for finding content related to the input text data. That is, any appropriate method can be used for searching.

Depending on the type of function of the search engine 304, the search engine 304 performs the processing using the database 110. In the search processing, a plurality of search engines can be used differently and properly as necessary, according to the type of search and the purpose of search.

In this exemplary embodiment, the operation history engine 306 performs an operation history search processing. The operation history engine 306 exists in a layer below the layer in which the module group 303 exists. However, this relationship of layers is just an example. That is, the configuration can be such that an operation history engine exists in the same layer as the module group 303 exists or that an operation history engine is included in an operation history module.

The operation history engine 306 stores on the database 110 an operation that is performed to the web APS 109 and the module group 303. The operation history engine 306 functions as an engine for finding a concerned operation history from among the stored operation history information, based on a condition acquired as input information.

Various operations (e.g., log-in operation, download operation, upload operation, and content search operation), time and date of the operation, and the operation of each user can be used as the condition.

The condition can also include an operation history such as "a person XXX performed a content search on ddd (date), mmm (month), yyy (year)".

In this exemplary embodiment, it is significant that the operation history engine 306 includes a function for finding an operation history. That is, any appropriate method can be used for searching.

Further, depending on the type of the operation history engine, the operation history engine 306 performs processing using the database 110.

Hereinbelow, a description is made as to a characteristic configuration and an operation according to the present exemplary embodiment with reference to an example of a data processing system as shown in FIG. 3.

Referring to FIG. 3, the web APS 109 includes the database 110 storing a given content accompanied by set search information. The web APS 109 has a configuration as described below.

The web APS 109 includes the search engine 304 that searches the content that is stored in the database 110 based on search information set at a time of registration in the database 110. The detailed description as to the search engine 304 is as described above.

The web APS 109 includes in the database 110 a storing unit that stores a history of request for search operation, which was made to the content stored in the database 110.

Figure 5:
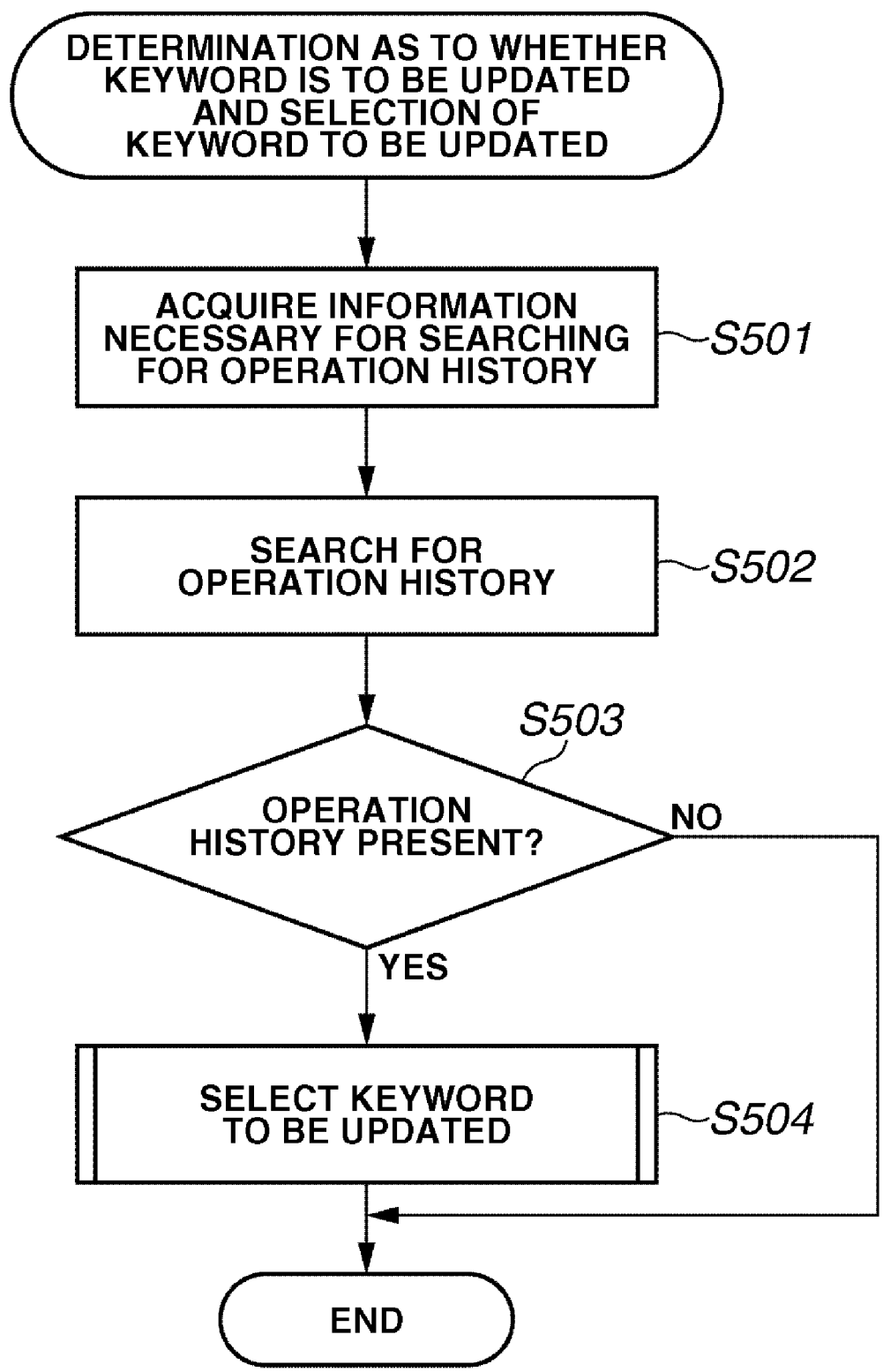
FIG. 5 is a flow chart illustrating an example of another data processing procedure performed by the server of the present invention.

Further, the search engine 304 collates a result of search and the search operation request history that is stored in the database 110, and then updates the search information stored in the database 110 that is set to the given content, according to a control procedure as shown in FIG. 5 and described later.

In addition, in the update processing by the search engine 304, the search engine 304 collates a result of search and the search operation request history that is stored in the database 110, and then selects the search information to be updated.

In the update processing by the search engine 304, the search engine 304 collates a result of search made by the search engine 304 and the search operation request history stored in the database 110, and then adds and updates the search information stored in the database 110 that is set to the given content.

Figure 4:
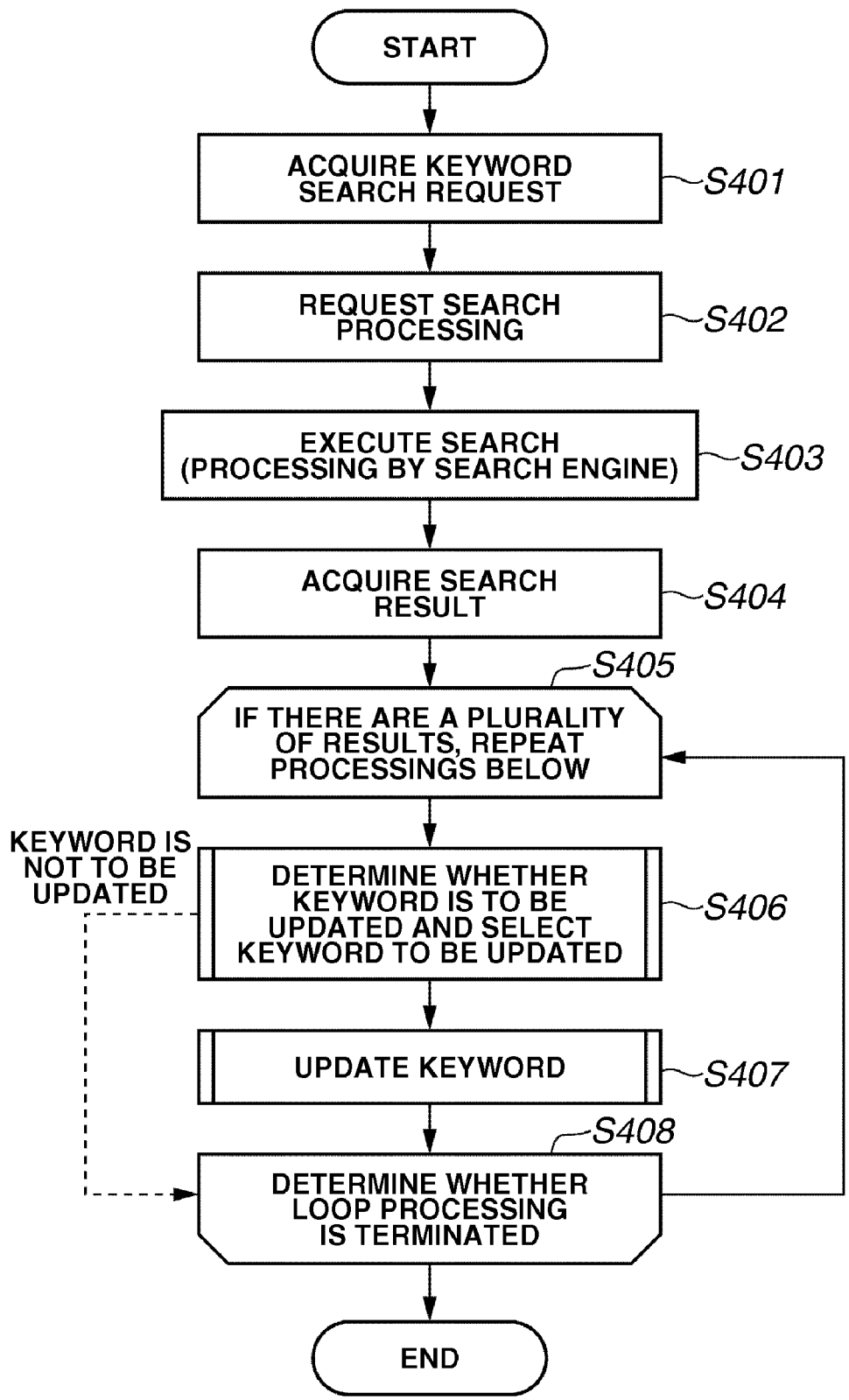
FIG. 4 is a flow chart illustrating an example of a data processing procedure performed by a server of the present invention.

FIG. 4 is a flow chart illustrating an example of a data processing procedure performed by a server of the present invention. The processing corresponds to the keyword processing procedure performed by a CPU of the web APS 109. The processing as shown in FIG. 4 includes steps S401 through S408. The CPU 202 executes a control program loaded in the PMEM 203 from the hard disk 210 to perform each step.

First, in step S401, the CPU 202 receives a keyword search processing request by communication with the client PCs 101, 102, and 103 via the Internet 106, the LAN 105, and the LAN 107. Here, the processing is for searching the registered content.

As described above, the client PCs 101, 102, and 103 can send a request to the web APS 109 from the web browser via the HTTP server 108. The request includes the search keyword and parameters indicating a type of search for the search processing by the web APS 109.

Then, in step S402, the web APS 109 receives the request from the client PCs 101, 102, and 103, and then requests the search processing using the search function for processing a request included in the module group 303.

Then, in step S403, the search engine 304 performs the search of the content stored in the database 110 based on the parameters that are sent from the client PCs 101, 102, and 103 via the web APS 109.

In this exemplary embodiment, the type of the search engine is not limited to a specific type. The parameters necessary for the search and preparations necessary for the search differ as per each type of search engine, and accordingly, the description as to the parameters and the preparations is not made in this exemplary embodiment. However, the parameters and the preparations can be applied to the present invention, regardless of the search engine that is used.

Then, in step S404, the module group 303 receives a result of the content search that is requested by step S403. The module group 303 receives following information, representatively.

That is, the module group 303 receives data name that concerns the parameters set to the search request sent from the client PCs 101, 102, and 103 via the web APS 109; total number of concerned matters; concerned results; extensions of each concerned data; and collateral information related to the concerned data.

Then, in step S405 (i.e., a step for starting a loop processing of steps S405 through S408), the CPU 202 repeats steps S405 through S408 when a plurality of contents are determined to be hit in step S404.

In step S405, the CPU 202 repeats the processing when there are plural results of determination by a loop repetition determination processing. In this exemplary embodiment, the loop is repeated for a number of times equivalent to the number of concerned matters obtained as a result of the search. That is, the processing is performed for all search results.

Then, in step S406, the CPU 202 makes a determination as to whether the keyword is to be updated and as to a selection of the keyword to be updated, with regard to the concerned content. The detailed description of the processing of this determination is made with reference to the flow chart of FIG. 5 described below.

Then, if it is determined in step S406 that the keyword is not updated as a result of the selection, the processing advances to step S408.

Figure 7:
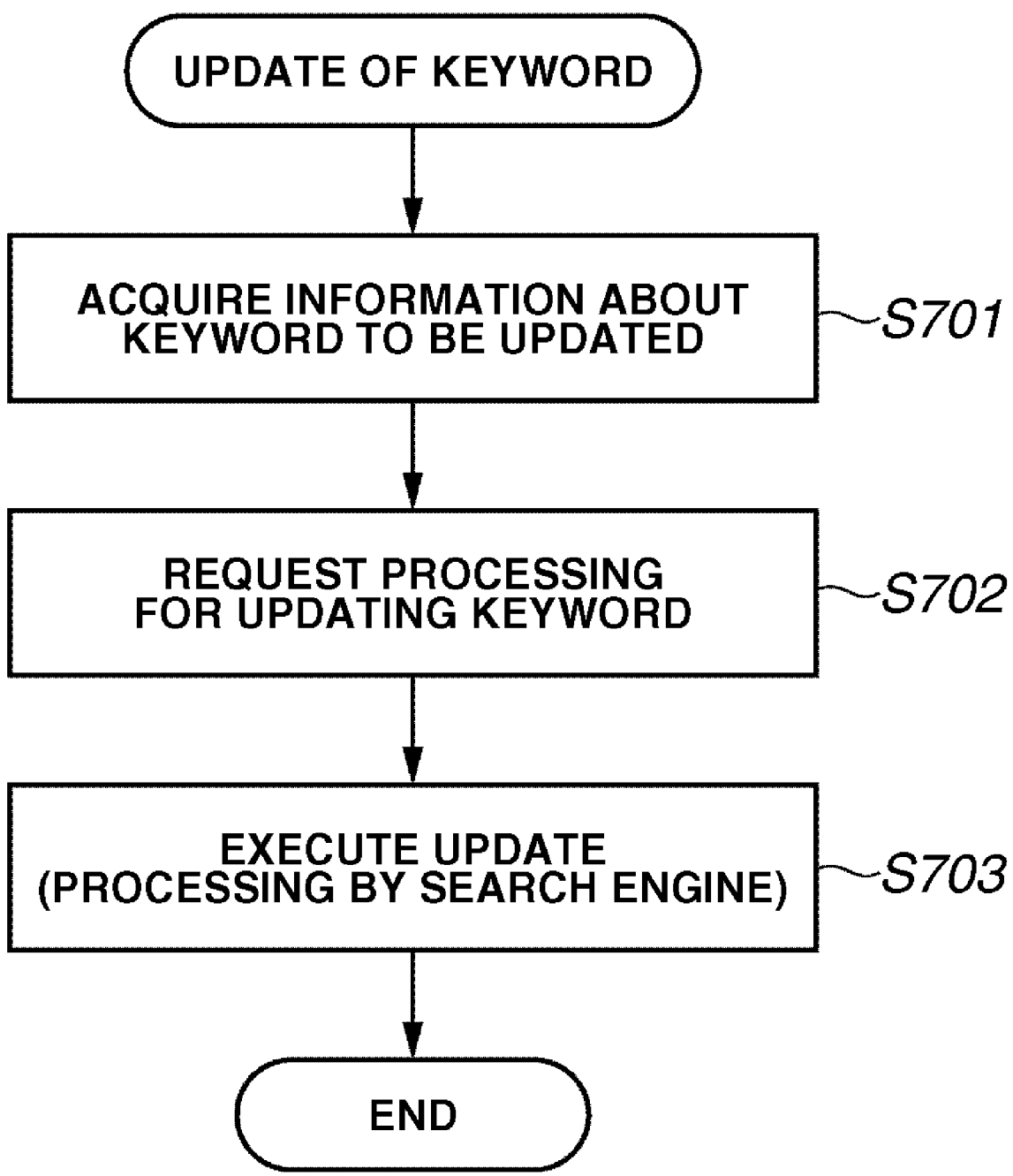
FIG. 7 is a flow chart illustrating an example of another data processing procedure performed by the server of the present invention.

On the other hand, if it is determined in step S406 that the keyword is to be updated using the selected keyword, the CPU 202 performs the keyword updating processing described in detail in FIG. 7 in step S407.

Then, in step S408, the CPU 202 determines if the loop of the keyword updating processing is terminated. If it is determined that the loop of the keyword updating processing is not terminated, the processing returns to step S405. If it is determined that the loop of the keyword updating processing is terminated, the processing ends.

FIG. 5 is a flow chart illustrating an example of data processing performed by the server of the present invention. The processing corresponds to a procedure performed by the CPU of the web APS 109 for determining whether the keyword is updated and determining selection of the keyword in step S406 as shown in FIG. 4. The processing as shown in FIG. 5 includes steps S501 through S504. The CPU 202 executes a control program loaded in the PMEM 203 from the hard disk 210 to perform each step.

First, in step S501, the CPU 202 acquires information necessary for searching the operation history. The information includes a time period of a matter to be searched, a user, and what processing is used for the search. In this exemplary embodiment, acquirement of the information is performed in such a manner that a content name is specified and a history of use of the content name is searched from operation history information stored in the database 110. The information is acquired from the web APS 109 or the database 110.

Then, in step S502, the CPU 202 searches the operation history. The processing in step S502 is performed by the operation history engine 306 as shown in FIG. 3. More specifically, the CPU 202 sends the information acquired by step S501 to the operation history engine 306 that searches the operation history.

In this exemplary embodiment, the type of the operation history engine is not limited to a specific type. The parameters and preparations necessary for the search differ as per each type of operation history engine, and accordingly, the parameters and the preparations are not described in this exemplary embodiment. However, the parameters and the preparations are those that can be applied to the present invention, regardless of the operation history engine that is used.

Then, in step S503, the operation history engine 306 determines whether a concerned search result is obtained by step S502. If the operation history engine 306 determines that there is no concerned search result, the operation history engine 306 determines that "no keyword to be updated", and then the processing ends.

On the other hand, if the operation history engine 306 determines that there is a concerned search result, the processing advances to step S504 so as to perform a processing for selecting a keyword to be updated. Details of processing for selecting the keyword to be updated (step S504) are described next with reference to the flow chart of FIG. 6.

Figure 6:
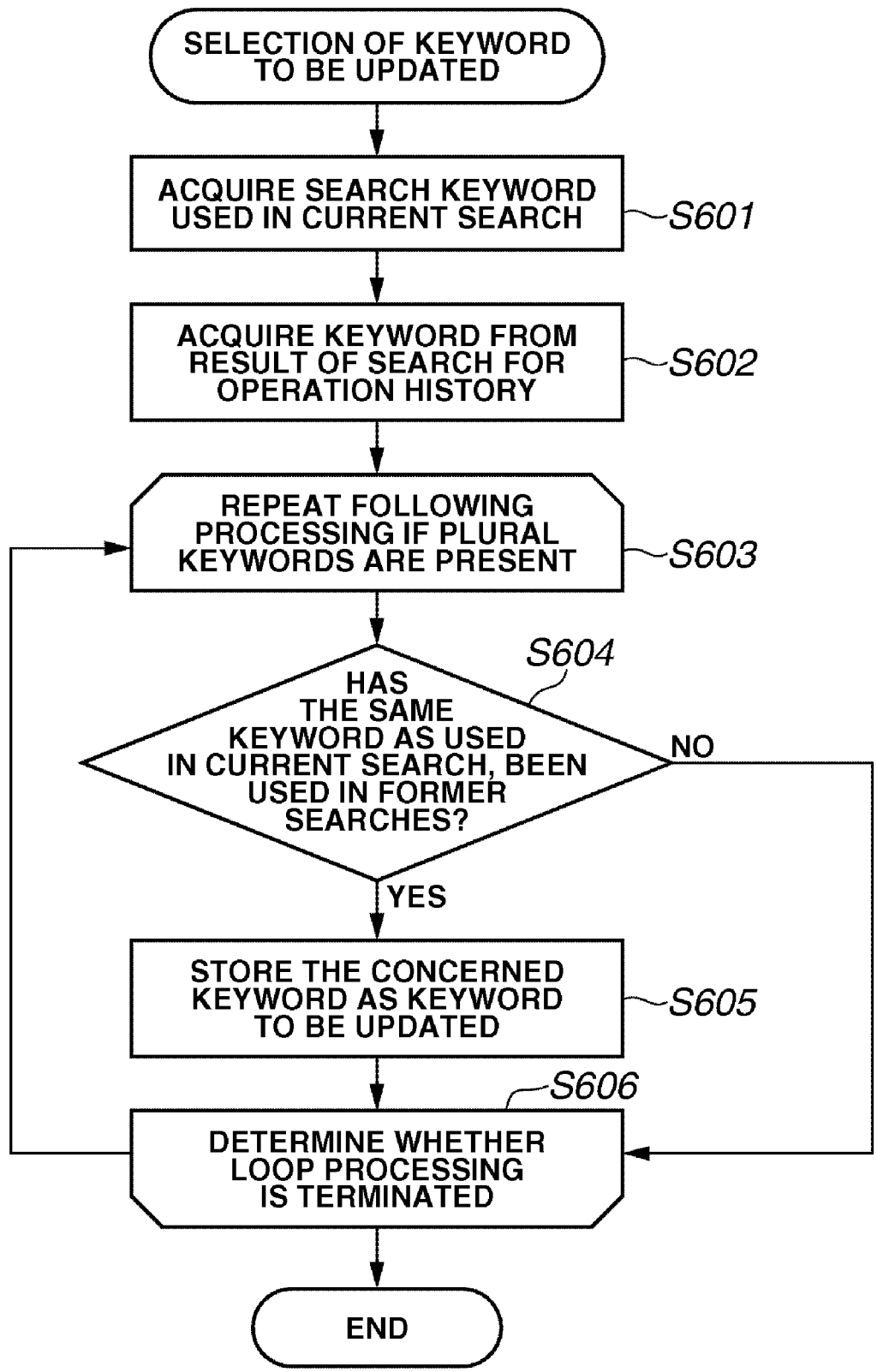
FIG. 6 is a flow chart illustrating an example of another data processing procedure performed by the server of the present invention.

FIG. 6 is a flow chart illustrating an example of a data processing performed by the server of the present invention. The processing corresponds to the procedure performed by the CPU of the web APS 109 for selecting the keyword to be updated (step S504 of FIG. 5). The flow chart of FIG. 6 includes steps S601 through S606. The CPU 202 executes a control program loaded in the PMEM 203 from the hard disk 210 to perform each step.

First, in step S601, the CPU 202 acquires the search keyword that was currently used. The search keyword is a search result obtained from the search engine 304. In this step, a search formula and a name of a concerned content can also be acquired in addition to the search keyword.

Then, in step S602, the CPU 202 acquires a keyword that is used, from the search result of the concerned operation history. The keyword is extracted based on data obtained by the operation history search processing in step S502.

Then, in step S603, the CPU 202 performs processing for making a determination about the loop processing including step S606. In the processing for determination about the loop processing, the CPU 202 determines whether there is more than one acquired keyword. If it is determined that there are plural keywords, the processing repeats step S604 and step S605. When it is determined that a plurality of keywords are not present in step S606, the processing ends.

On the other hand, if it is determined that there are a plurality of keywords in step S603, then, in step S604, the CPU 202 compares the acquired search keyword that was used and the search keyword that is extracted from the operation history and acquired in step S603, and determines whether the same keyword is used. The comparison and determination processing is performed by checking if the same keyword as the keyword currently used is present in the search keyword extracted from the operation history. If the CPU 202 determines that same keyword is not present, the processing advances to step S606 so as to determine whether steps S604 and S605 are to be repeated.

On the other hand, if it is determined that the same keyword as the keyword currently used is present in the search keyword extracted from the operation history, then in step S605, the CPU 202 adds the same search keyword to the keywords for searching the contents and stores the same search keyword in the storage area such as the database 110.

Then, in step S606, the CPU 202 determines whether the loop processing is to be terminated, based on the result of determination by step S603. If it is determined that a plurality of keywords are not present, the processing ends.

FIG. 7 is a flow chart illustrating an example of a data processing procedure performed by the server of the present invention. The processing corresponds to the keyword updating procedure performed by the CPU of the web APS 109 (step S407 of FIG. 4). The flow chart of FIG. 7 includes steps S701 through S703. The CPU 202 executes a control program loaded in the PMEM 203 from the hard disk 210 to perform each step.

First, in step S701, the CPU 202 acquires information about the search keyword to be updated. The information is the data stored in step S605 as shown in FIG. 6.

Then, in step S702, the search processing module F5 requests updating of the search keyword to the search engine 304.

Then, in step S703, upon request in step S702, the search engine 304 performs the updating of the search keyword to the keyword stored in the database 110, and then the processing ends. The details of the processing unit for updating the search keyword differs as per each search engine.

The parameters necessary for the updating and preparations necessary for the updating differ as per type of search engine, and accordingly, the parameters and the preparations are not described in this exemplary embodiment. However, the parameters and the preparations can be applied to the present invention, regardless of the search engine that is used.

The flow of the processing according to the first exemplary embodiment is as described above. Next, the various types of data used in the first exemplary embodiment are described.

Figure 8:
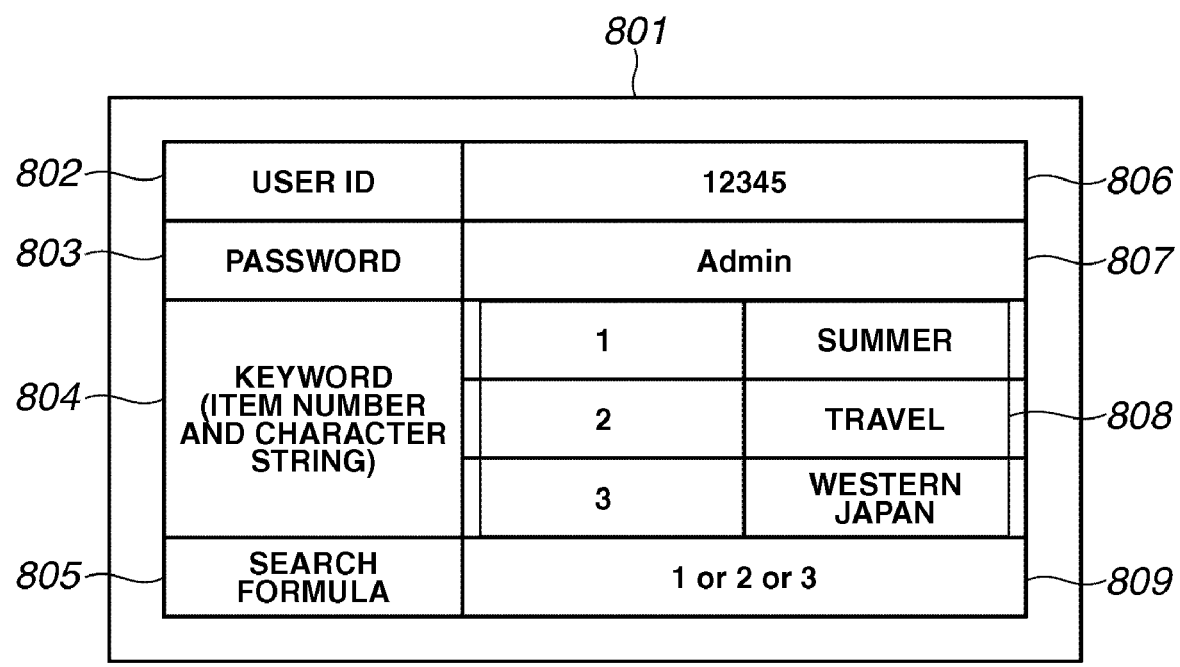
FIG. 8 illustrates one example of information received from the client PC shown in FIG. 1 as a search request.

FIG. 8 illustrates one example of information received from the client PCs 101, 102, and 103 shown in FIG. 1 as a request for search. As an example, the data stored in the storage medium in the client PCs 101, 102, and 103 and the web APS 109 are shown.

In this exemplary embodiment, the data as shown in FIG. 8 is equivalent to the data received in step S401 in the control flow as shown in FIG. 4.

Referring to FIG. 8, data 801 is data that is received. In FIG. 8, the data 801 including a user ID 802, a password 803, a keyword 804, and a search formula 805 are received in a set from any of the client PCs 101, 102, and 103 by a given protocol.

FIG. 8 shows a user ID area 802. The user ID is used for determining the user who requests the search processing. The user ID is set by application software in the client PCs 101, 102, and 103.

The information shown in FIG. 8 includes a user ID data portion 806 that corresponds to the user ID area 802. The user ID data portion 806 includes, for example, "12345".

The information in FIG. 8 includes a password area 803. The password area 803 is used for log-on processing and confirmation of authority of the user, in combination with the user ID displayed in the user ID area 802. The password is set by application software in the client PCs 101, 102, and 103.

The information in FIG. 8 includes a password data portion 807 that corresponds to the password area 803. The password data portion 807 includes, for example, "Admin". The password data portion 807 can be encoded.

The information in FIG. 8 includes a search keyword area 804. The keyword area 804 is divided into two areas, namely, an item number area and a character string area.

The information in FIG. 8 includes a keyword data portion 808 that corresponds to the keyword area 804. An amount of data input to the keyword data portion 808 varies according to information input by the user, and a specification of the search engine.

In this example, the keyword data portion 808 includes "item number 1: summer, item number 2: travel, and item number 3: western Japan" as the keyword.

The information in FIG. 8 includes a search formula area 805 and a search formula data portion 809 that corresponds to the search formula area 805. In this example, the actual data portion 809 includes "1 or 2 or 3".

It can be understood that the information "1 or 2 or 3" refers to the search by using the keyword "summer or travel or western Japan", when compared with actual data in the actual data portion 808. In this exemplary embodiment, the information is as described above. However, an amount of information can be expanded as necessary. Besides, "or" and "and" can be used in combination, and further, only "and" can be used.

Figure 9:
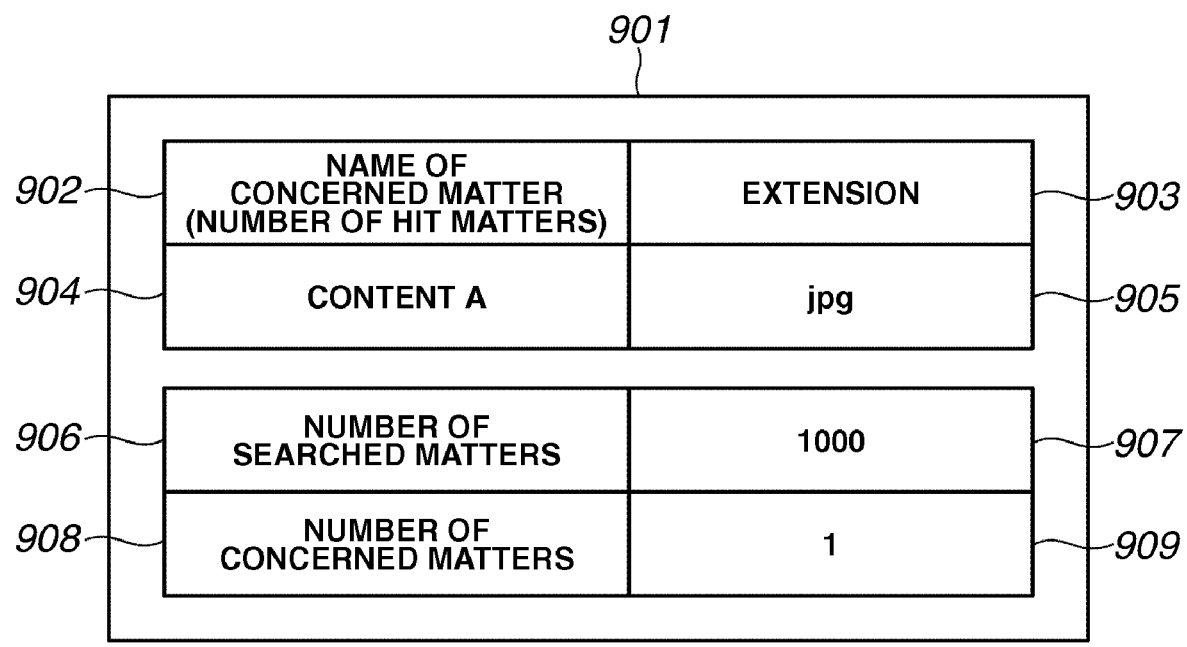
FIG. 9 illustrates an example of the data stored in a storage medium in the web as shown in FIG. 3.

FIG. 9 illustrates an example of the data stored in the storage medium in the web APS 109 as shown in FIG. 3. The hard disk 210 as shown in FIG. 2 is suitable as the storage medium.

The data in FIG. 9 is an example of the search result that the module group 303 receives from the search engine 304. The data is stored in the storage medium in the web APS 109.

Referring to FIG. 9, data 901 is data that is received. The received data 901 includes a concerned matters name 902, an extension 903, a number of search matters 906 and a number of concerned matters 908. The concerned matters name data 902 indicates a file name of the concerned search result. Content data 904 indicates a concerned search result, which includes, for example, "content A". Extension data 905 indicates an extension that corresponds to the content data 904 and includes, for example, "jpg".

Number of searched matters data 906 indicates a total number of searched matters. Searched matters data 907 indicates information corresponding to the number of searched matters data 906, and includes, for example, "1000", which means that the search engine 304 has searched from among a thousand searching matters.

Number of concerned matters data 908 indicates a number of concerned matters obtained as a result of a search of the database 110 by the search engine 304.

Number of concerned matters data 909 shows information corresponding to the number of concerned matters data 908 that indicates the number of concerned matters. The number of concerned matters data 909 indicates a number of hit matters, for example, "1" which means that with regard to the data 904, only one piece of data is concerned.

Figure 10:
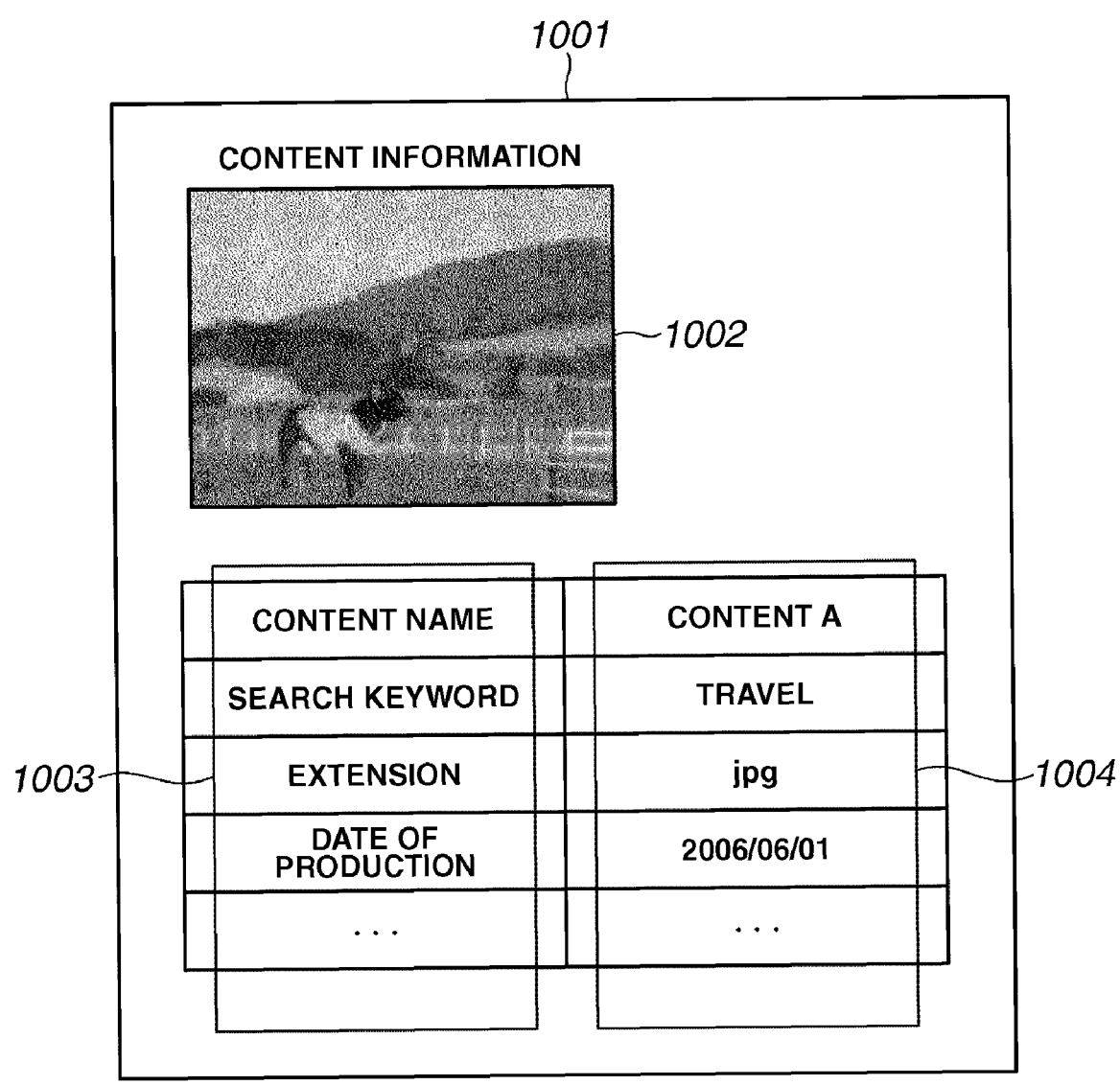
FIG. 10 illustrates one example of the data acquired from a search engine as shown in FIG. 3.

FIG. 10 illustrates one example of the data acquired from the search engine 304 as shown in FIG. 3. The data shown in this example is the search result acquired by the search engine 304 in step S404 as shown in FIG. 4. Besides, a web page to be displayed in the client PC can be produced based on the search result data.

Referring to FIG. 10, data 1001 is data that is received. The information in FIG. 10 includes data 1002 that indicates the content determined to be concerned as a result of the search. The data 1002 is assumed to be actually handled information regarding a reference destination of a file. In this exemplary embodiment, the data 1002 is described as image data for easier understanding. In FIG. 10, an example of image data integrally includes "summer", "travel", and "a dog that a photographer met".

A data type area 1003 is linked to the data 1002. The type of data included in the data type area 1003 varies according to the system. In this example, the data type area 1003 includes data type areas 1003 such as a "content name" area, a "search keyword" area, an "extension" area, and a "date of production" area.

Data 1004 indicates data that corresponds to the data type areas 1003. In this example, the data 1004 includes "content A", "travel", "jpg", and "2006/06/01". That is, the data determined to be concerned by the search has a content name "content A", the search keyword is "travel", the extension is "jpg", and the data is produced on "2006/06/01". In this example, the image data shows, as an example, the dog that the photographer has met on a travel.

Figure 11:
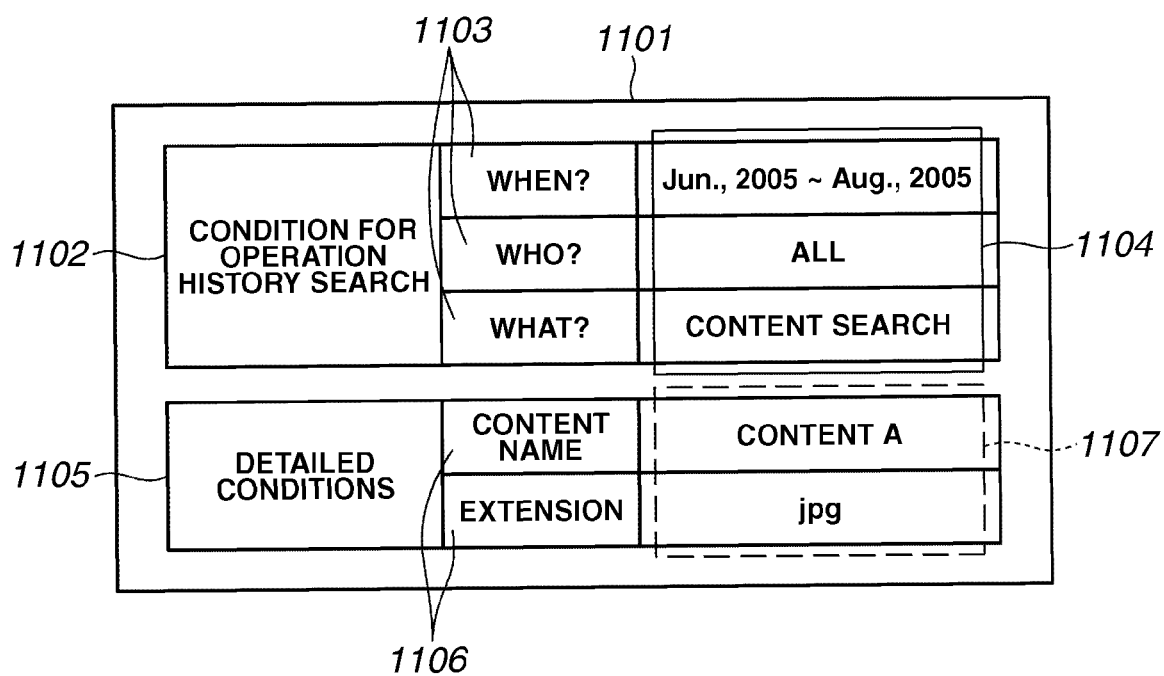
FIG. 11 illustrates one example of the data stored in the storage medium in the web APS as shown in FIG. 1.

FIG. 11 illustrates one example of the data stored in the storage medium in the web APS 109 as shown in FIG. 1. In this example, the data is acquired in step S501 as shown in FIG. 5 and stored in the storage medium in the web APS 109.

Referring to FIG. 11, data 1101 is the data that is received. A search condition area 1102 is used for the operation history. The search condition area 1002 is further divided into search areas 1103. In this exemplary embodiment, the search condition area 1102 includes three areas, namely, "when?", "who?", and "what?". Other conditions can also be added.

Data 1104 indicates values corresponding to the search area 1103 and includes, for example, "Jun.,2005-Aug.,2005", "all", and "content search".

That is, the data 1101 shows that the operation history is searched under conditions of the "content search" performed by "all" the users within a time period of "Jun.,2005-Aug., 2005".

In addition, FIG. 11 shows a detailed search condition area 1105. The detailed search condition area 1105 is further divided into search areas 1106. In this exemplary embodiment, the detailed search condition area 1105 includes two areas, namely, a "content name" area and an "extension" area.

Data 1107 indicates each value corresponding to the search area 1106 and includes, for example, content name "content A" and extension "jpg".

By combining the conditions in the data 1104 and the data 1107, the search condition is set such that the operation history having a content name "content A" and an extension "jpg" is searched from among the operation histories subjected to "content search" by "all" the users within a time period "Jun.,2005-Aug.,2005". The search condition is set to the search engine 304.

FIG. 12 illustrates one example of a search result for the operation history that is received from the operation history engine 306 as shown in FIG. 3. In this example, the data is acquired in step S502 as shown in FIG. 5 and stored in the storage medium in the web APS 109. The determination processing in step S503 as shown in FIG. 5 is performed based on the data.

Referring to FIG. 12, data 1201 is data that is received. The example as shown in FIG. 12 includes an area 1202 that indicates an item number of the search result. In this example, three pieces of data are found by the search.

The example as shown in FIG. 12 includes data 1203, 1204, and 1205 of a search result for the operation history. The search result for the operation history differs as per each operation history engine. However, the present invention can be applied regardless of the type of operation history engine that is used.

In this example, the result data 1203 indicates a first result, which shows that "the content A was searched on July 1 using search keywords "travel" and "summer"". The result data 1204 indicates a second result, which shows that "the content A was searched on July 20 using search keywords "travel" and "sea"". The result data 1205 indicates a third result, which shows that "the content A was searched on July 30 using search keywords "travel" and "Okinawa"". The result data 1203, 1204, and 1205 concern the data 1101 that is the search condition.

In step S503 as shown in FIG. 5, the determination is made using the data 1201 of the search result. The determination processing is made based on whether there is a search result, as described above. Accordingly, when the data 1201 is considered, three matters concern the search. Accordingly, it is determined in step S503 that there is an operation history, and then the processing advances to step S504.

Figure 13:
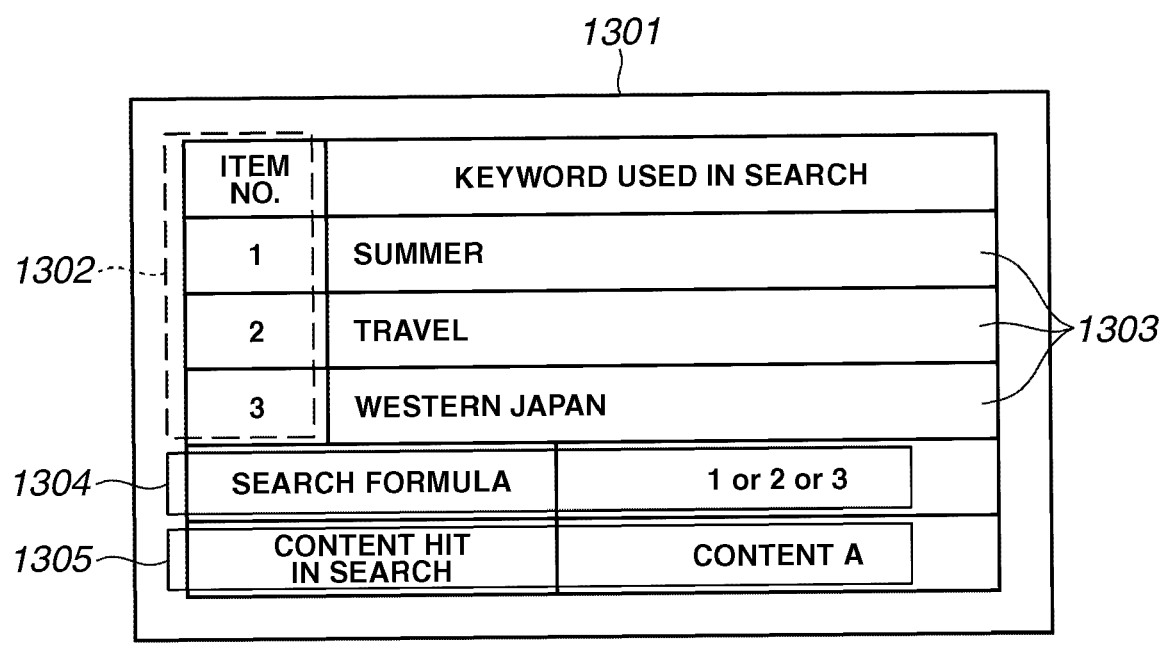
FIG. 13 illustrates one example of the data stored in the storage medium in the web APS as shown in FIG. 1.

FIG. 13 illustrates one example of the data stored in the storage medium in the web APS 109 as shown in FIG. 1. This example shows the data acquired from the operation history engine 306 in step S601 as shown in FIG. 6. The data shown in this example represents only necessary information picked out from the data 801 as shown in FIG. 8, and is stored in the storage medium in the web APS 109.

Referring to FIG. 13, data 1301 is data that is received. In FIG. 13, the information includes an item number 1302 of the search keyword 1303 that was used. The search keyword 1303 has the similar value to the actual data portion as shown in FIG. 8.

That is, three keywords, namely, "summer", "travel", and "western Japan" are used. The information includes data 1304 of the search formula. The search formula data 1304 is the same as the data described in the actual data portion 809, and accordingly, the description thereto is not repeated here. The information includes a content 1305 that concerns the search. It is understood from the result described in the data 1004 as shown in FIG. 10 that the concerned content is "content A".

Figure 14:
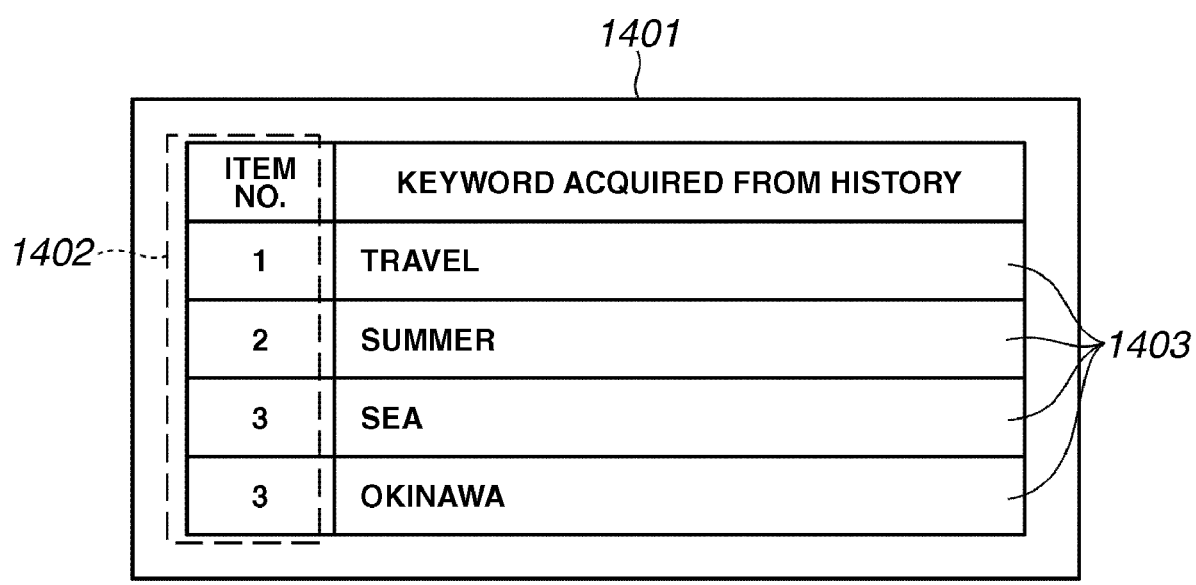
FIG. 14 illustrates one example of the data stored in the storage medium in the web APS as shown in FIG. 1.

FIG. 14 illustrates one example of the data stored in the storage medium in the web APS 109 as shown in FIG. 1. FIG. 14 shows one example of keywords extracted from the data as shown in FIG. 12. The data in this example is acquired in step S602 as shown in FIG. 6. The data in this example indicates only necessary information picked out from the data 1201 as shown in FIG. 12, and is stored in the storage medium in the web APS 109.

Referring to FIG. 14, data 1401 is data that is received. In FIG. 14, the information includes an item number 1402 of the operational history search keyword 1403 hat was used. The example in FIG. 14 indicates the keyword parts picked up from the data 1203, 1204, and 1205 as shown in FIG. 12, namely, four words, "travel", "summer", "sea", and "Okinawa" are used.

The data 1301 as shown in FIG. 13 and the data 1401 as shown in FIG. 14 are used in the determination processing in step S604 as shown in FIG. 6. In the determination processing in step S604, keyword areas of the data 1301 and the data 1401 are compared to find a common keyword.

That is, the search keyword 1303 as shown in FIG. 13 and keywords 1403 as shown in FIG. 14 are compared. Here, there is a common keyword "summer". Because the same keyword "summer" exists in the operation history searched from among the operation histories, it is determined that the same keyword is used in step S604, and the processing advances to step S605.

Figure 15:
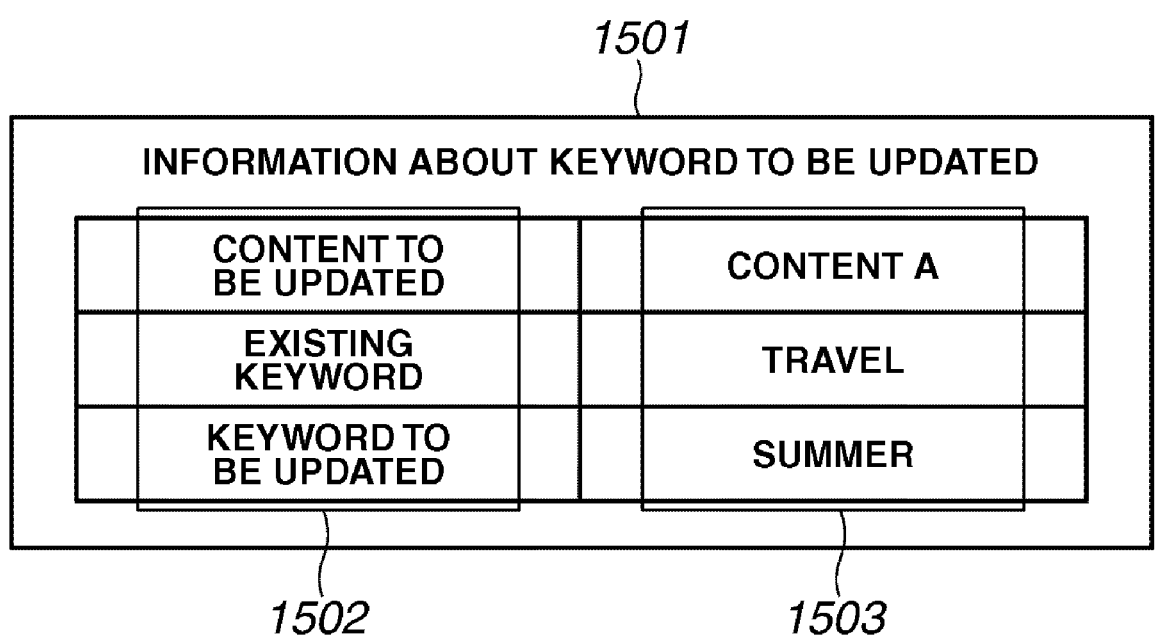
FIG. 15 illustrates one example of the data stored in the storage medium in the web APS as shown in FIG. 1.

FIG. 15 illustrates one example of the data stored in the storage medium in the web APS 109 as shown in FIG. 1. The data in the example is produced and stored in step S606 as shown in FIG. 6 and is stored in the storage medium in the web APS 109.

Referring to FIG. 15, data 1501 is data that is received. In FIG. 15, the information includes an area 1502 that indicates a category of each data. The area 1502 includes columns for the contents to be updated, an existing keyword, and the keyword to be updated. Data 1503 corresponds to the area 1502 and includes information "content A", "travel", and "summer". That is, the content to be updated is "content A", the existing keyword that the content A includes is "travel", and the keyword that is newly added to the content A to update the keyword is "summer".

The keyword "summer" is acquired from the search history (operation history) of the former searches over the same content, as described above. In deciding whether the keyword used in the current search is added to the content, if there is a trace indicating that other person used the same keyword in the past, it is determined that the keyword used in the current search is added to the content. This is the characteristic point of this exemplary embodiment.

Since a conventional technique lacks this determination processing, it has a defect such that the keyword is inappropriately set even when an odd keyword is used.

The above description is concerned with the keyword used in the "past". However, a specific time period can be set including future searches so as to make the determination by storing past and future logs.

The information produced in FIG. 15 is acquired in step S701 as shown in FIG. 7, and then in step S703, the search engine 304 performs updating of the search keyword.

Figure 16:
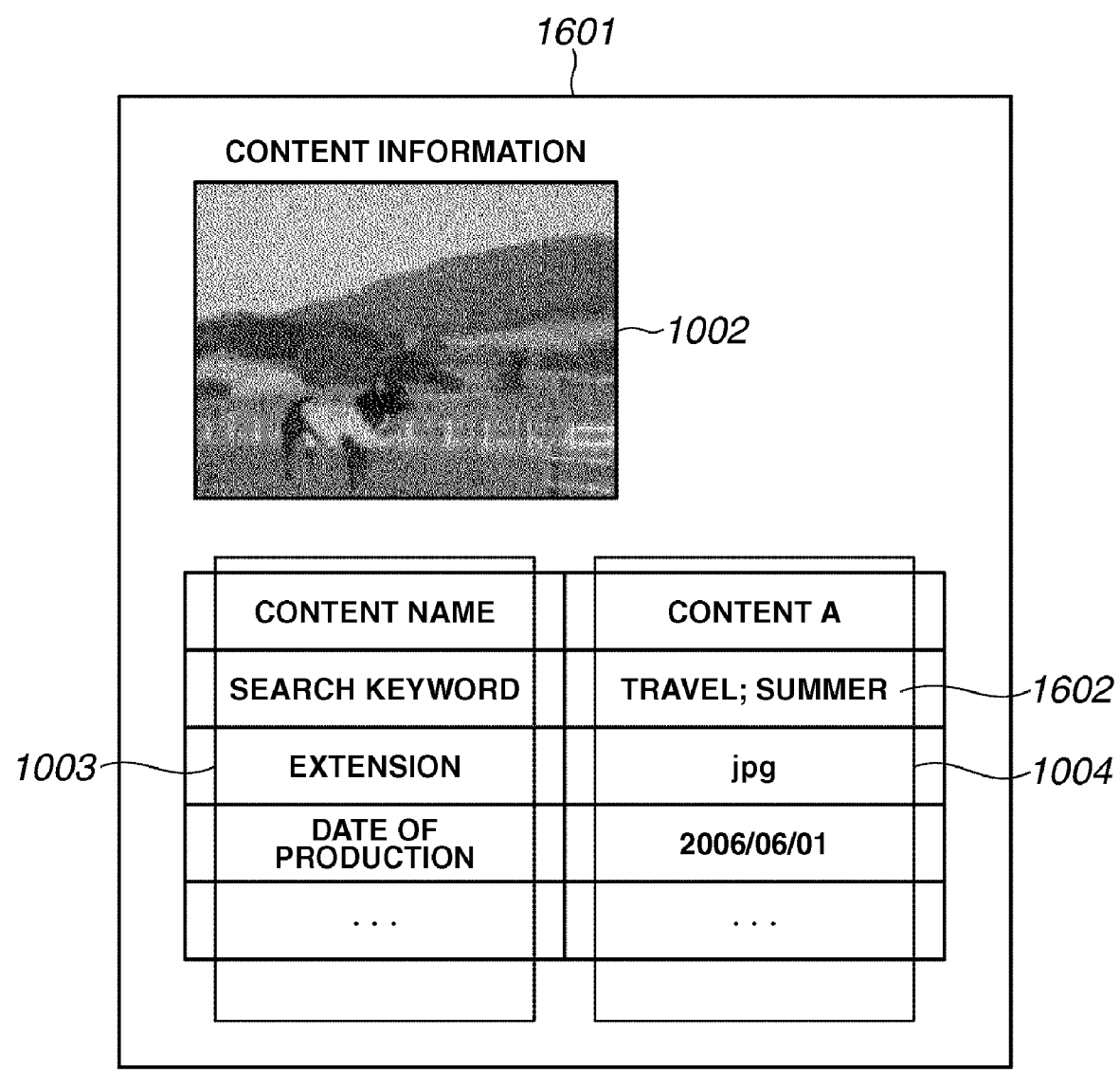
FIG. 16 illustrates one example of the data of the search result as shown in FIG. 3 that is received from the search engine.

FIG. 16 illustrates one example of the search result 1601 as shown in FIG. 3 that is received from the search engine. The data in this example indicates information of the content A that is already updated. The configuration of the data is the same as FIG. 10. A web page that is displayed by the client PC can be produced based on the data of the search result.

The data 1002, 1003, and 1004 are the same as those described in FIG. 10.

Referring to FIG. 16, the information includes a search keyword 1602 that is updated.

In the example of the content as shown in FIG. 10, the search keyword 1003 includes only one keyword "travel". The example in FIG. 16 shows that the keyword "summer" is added after completing the processing according to the above flow. Thus, the content A corresponds to the search keyword "travel" or "summer".

As described above, in the first exemplary embodiment, the keyword used for the search and the keyword formerly used which is searched from among the operation histories are compared, with regard to the content that the user has found.

If, as a result of the comparison, there is the same keyword, it is determined that the keyword can be accepted by an indefinite number of users who uses the database 110 and that the keyword is qualified to be added to the content. Thus, the keyword updating processing is performed.

According to the first exemplary embodiment, the keyword linked to the content is updated every time the keyword is used. Accordingly, the user can more effectively find a desired content as the user performs the operation many times.

Since the keyword to be updated is checked as to whether the keyword is appropriate, by searching the operation history, an inappropriate search keyword is not added to the content, as that occurs in a conventional technique.

Second Exemplary Embodiment

In the first exemplary embodiment, whether the keyword is appropriate and is to be added to the content, is determined based on the same keyword formerly used, by searching the operation history. In the second exemplary embodiment, the processing for selecting the keyword is performed considering the search result so as to register a more appropriate keyword. Hereinbelow, the second exemplary embodiment is described in detail.

Unless specially noted, the configuration and the flow of the processing are the same as those in the first exemplary embodiment.

Figure 17:
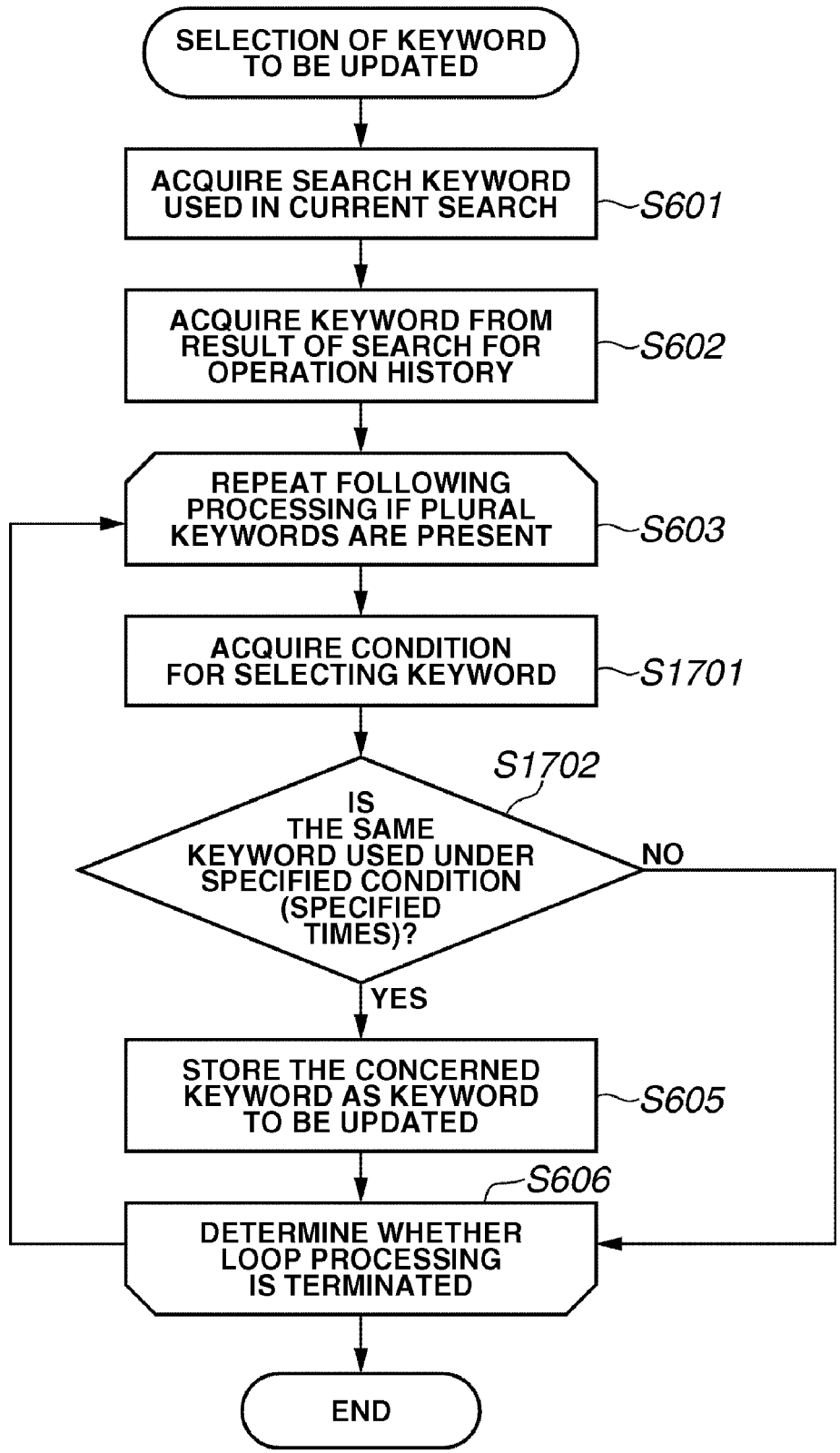
FIG. 17 is a flow chart illustrating an example of another data processing procedure performed by the server of the present invention.

FIG. 17 is a flow chart illustrating an example of data processing performed by the server of the present invention. The processing corresponds to the processing for selecting the keyword to be updated, performed by the CPU of the web APS 109.

The processing as shown in FIG. 17 includes steps S601 through S603, S1701, S1702, S605, and S606. In addition, each step is performed in such a manner that the CPU 202 executes a control program loaded in the PMEM 203 from the hard disk 210. The flow of the processing is the same as shown in FIG. 6 except for step S1701 and step S1702, and accordingly, the description as to the same steps is not repeated here.

After the process enters the determining step as to the loop processing in step S603, the CPU 202 acquires information that is a condition for selecting the keyword used in later steps, in step S1701.

The above information is the data stored in the storage medium in the web APS 109. The acquired information includes, for example, "a number of usage" and a "maximum number of characters", as the condition for selecting the keyword. Other information such as a "period of use" and a "frequency of use" can also be included.

Then, in step S1702, the CPU 202 compares the acquired used keyword, with the search keyword extracted from the operation history, which is acquired in step S603. At this time, unlike the first exemplary embodiment, information corresponding to the keyword selection condition acquired in step S1701 is considered.

If there is the same keyword as the keyword used for the current search among the search keywords extracted from the operation history, the determination is made considering whether the same keyword satisfies the number of usage and the restriction on the number of characters. If it is determined that the same keyword satisfies the number of usage and the restriction on the number of characters, the processing advances to step S605.

In this manner, in this exemplary embodiment, condition setting processing is performed in which a selection condition for updating search information is set. In the keyword selection processing by step S406 as shown in FIG. 4, the search information to be updated is selected based on the set selection condition.

On the other hand, if it is determined that there is no same keyword that satisfies the number of usage and the restriction on the number of characters, the processing advances to step S606 so as to determine whether the loop processing is to be repeated. The subsequent steps are the same as the steps S605 and S606 as shown in FIG. 6, and accordingly, the description thereto is not repeated here.

Figure 18:
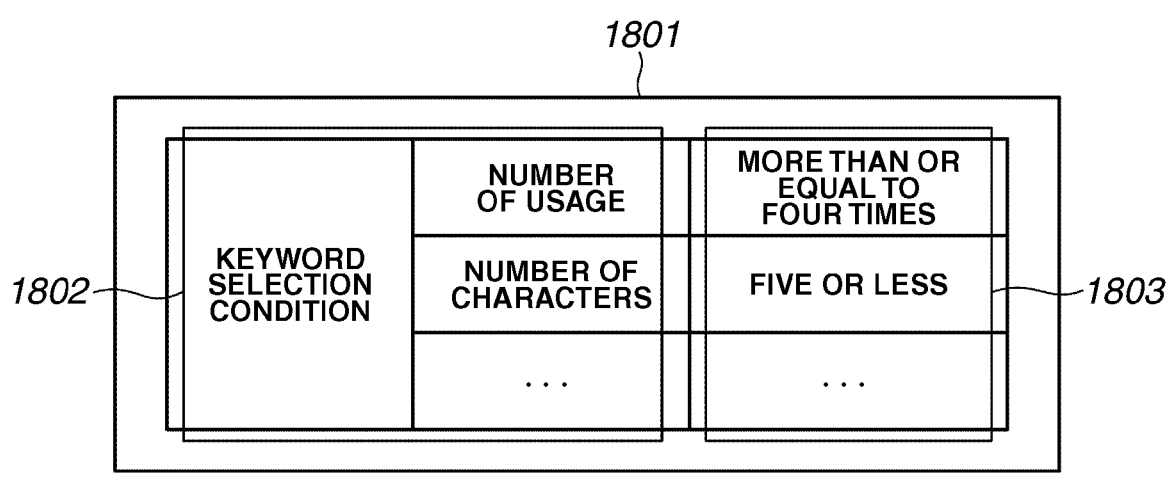
FIG. 18 illustrates one example of the data stored in the storage medium in the web APS as shown in FIG. 1.

FIG. 18 illustrates one example of the data that is stored in the storage medium in the web APS 109 as shown in FIG. 1. In this example, the data is acquired by step S1701 as shown in FIG. 7 and is stored in the storage medium in the web APS 109.

Referring to FIG. 18, data 1801 is data that is received. In FIG. 18, the information includes a keyword selection condition area 1802. The selection condition is further divided. For example, here, the selection condition includes information "number of usage" and "number of characters".

Selection condition data 1803 corresponds to the selection condition area 1802 and has a value such as "more than four times" and "five or less (characters)".

FIG. 19 illustrates one example of a search result about the operation history received from the operation history engine 306 as shown in FIG. 3. In this example, the data belongs to the same classification as the first exemplary embodiment; however, the acquired history differs from the first exemplary embodiment. That is, in the second exemplary embodiment, the data as shown in FIG. 19 is the operation history data acquired by step S502 as shown in FIG. 5, instead of the data shown in FIG. 12 as described in the first exemplary embodiment.

The data of the search result about the operation history that is received from the operation history engine 306, is stored in the storage medium within the web APS 109.

Referring to FIG. 19, the search result data 1901 includes an area 1902 indicates the item number of the search result. In this example, seven pieces of data 1903-1909 are found as a result of the search about the operation history. The search result about the operation history differs as per each operation history engine, however, the present invention can be applied regardless of the operation history engine that is used.

The data 1903 indicates first search result data and shows that "content A was searched on July 1 using "travel" and "summer" as the search keyword". The data 1904 indicates second search result data and shows that "content A was searched on July 2 using "travel" and "sea" as the search keyword".

The data 1905 indicates third search result data and shows that "content A was searched on July 10 using "travel" and "summer" as the search keyword". The data 1906 indicates fourth search result data and shows that "content A was searched on July 11 using "travel", "summer", and "sea" as the search keyword".

The data 1907 indicates fifth search result data and shows that "content A was searched on July 12 using "travel" and "western Japan" as the search keyword".

The data 1908 indicates sixth search result data and shows that "content A was searched on July 20 using "travel", "summer", and "western Japan" as the search keyword". The data 1909 indicates seventh search result data and shows that "content A was searched on July 25 using "travel" and "summer" as the search keyword".

When the search result is used, the data acquired by step S602 as shown in FIG. 6 is as illustrated in FIG. 20.

FIG. 20 illustrates one example of the data stored in the storage medium in the web APS 109 as shown in FIG. 1. In this exemplary embodiment, the data is acquired by step S602 as shown in FIG. 6 and indicates only necessary information (the keyword and the number of times of keyword search) extracted from the data 1901 only as shown in FIG. 19. The data is stored in the storage medium in the web APS 109.

Referring to FIG. 20, data 2001 is data that is received. The information in this example includes an item number 2002 of the used search keyword and keywords 2003 for searching the used operation history. The keyword 2003 includes four keywords, namely, "travel", "summer", "sea", and "western Japan" in the example shown in FIG. 20. In addition, the information 2004 represents a number of usage of the search keyword. When the number of usage 2004 and the search keyword 2003 are set to each other, "travel" has been used "seven times", "summer" "five times", "sea" "twice", and "western Japan" "twice".

In step S1702 as shown in FIG. 17, determination is made using the search keyword 1303 as shown in FIG. 13, the search keyword 2003 as shown in FIG. 20, the selection condition data 1803 as shown in FIG. 18 as shown in FIG. 18 and the number of usage 2004 as shown in FIG. 20.

By comparing the data 1003 and the search keyword 2003, the same keywords are narrowed down to "travel", "summer", and "western Japan".

The keyword "travel" is already registered from the data 1004 as shown in FIG. 10, and thus the keyword "travel" is omitted from the same keywords. That is, candidates of the keyword to be added are "summer" and "western Japan". Here, when the selection condition data 1803 and the number of usage 2004 are considered, there is a restriction such that only the keyword used for more than four times and having five characters or less can be added.

Accordingly, "western Japan", which is used only twice, cannot be added. The keyword "summer" satisfies the condition of five characters or less. Accordingly, "summer" is selected as the keyword to be added. The processing thereafter is the same as in the first exemplary embodiment, and thus the description thereto is not repeated here.

As described above, in the second exemplary embodiment, in addition to the configuration of the first exemplary embodiment, in selecting the keyword, the condition is set. When it is determined that the keyword is appropriate to be added to the contents, based on the set condition, the keyword updating is performed.

According to the second exemplary embodiment, the keyword linked to the content is updated every time the keyword is used. Therefore, the user can more effectively find a desired content as the user performs the operation many times.

In addition, it is determined whether it is appropriate to add the keyword to the content, based on the operation history and the selection condition such as the number of usage and the number of characters. Accordingly, an inappropriate search keyword is not added to the content, as that occurs in a conventional technique.

Third Exemplary Embodiment

In the first and the second exemplary embodiments, the case is described where in adding the search keyword to the content, it is determined whether the keyword found by the search is appropriate.

Because the search history varies in the course of the operation of the database, the keyword that is added and registered can lose appropriateness as the time passes from the registration of the keyword in the content.

Accordingly, when the search engine updates the selected keyword, the keyword can be not only added to the content but can also be deleted from the content. Hereinbelow, in the third exemplary embodiment, a method of deleting the keyword that is determined to be unnecessary is described.

Unless noted, the configuration and the flow of the processing are the same as those in the second exemplary embodiment.

Figure 21:
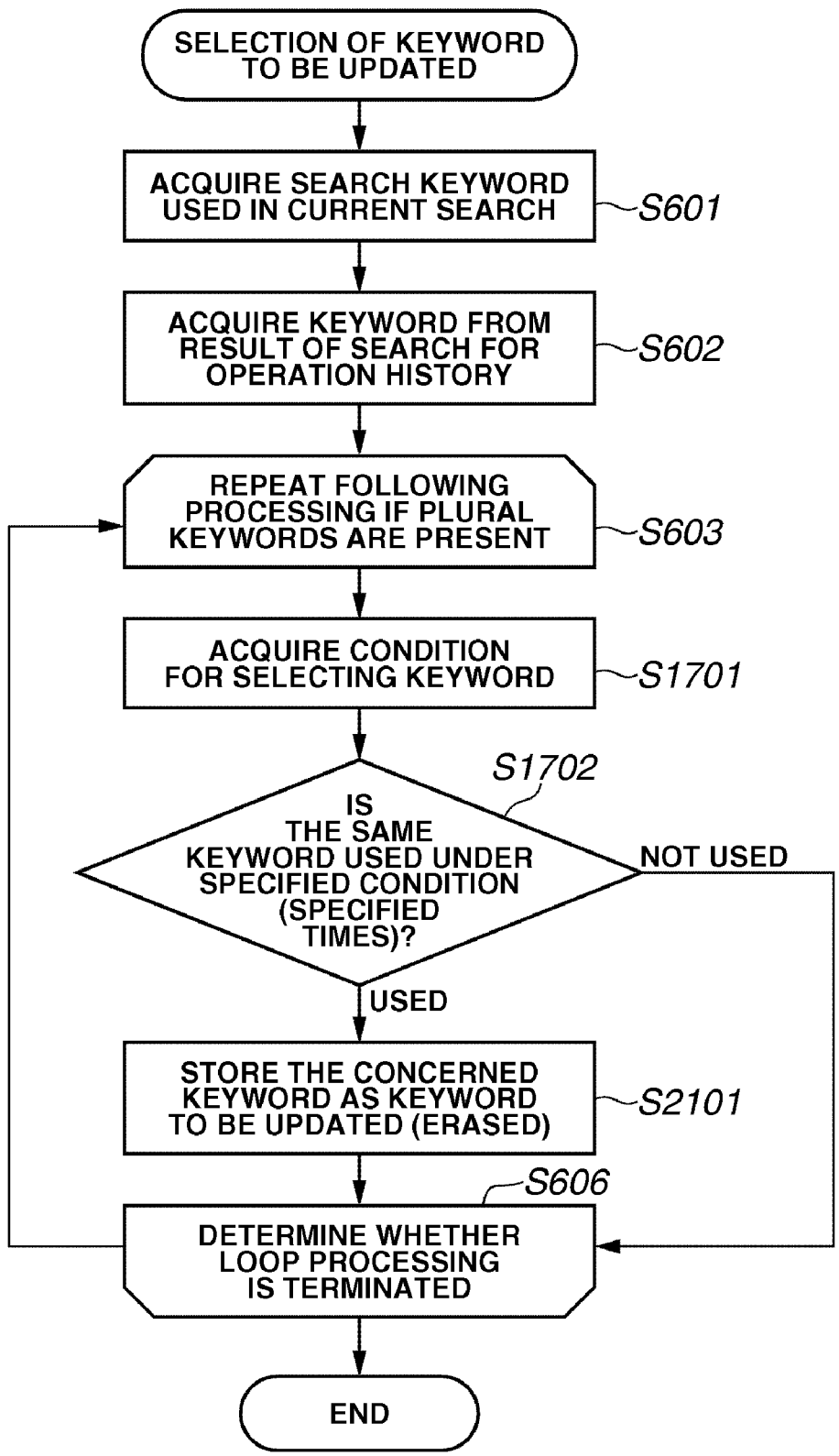
FIG. 21 is a flow chart illustrating an example of another data processing procedure performed by the server of the present invention.

FIG. 21 is a flow chart illustrating one example of data processing performed by the server of the present invention. This processing corresponds to the processing for selecting the keyword to be updated that is performed by the CPU of the web APS 109. The processing as shown in FIG. 21 includes steps S601 through S603, S1701, S1702, S2101, and S606. Each step is performed in such a manner that the CPU 202 executes a control program loaded in the PMEM 203 from the hard disk 210. The flow of the processing is the same as shown in FIG. 17 except for step S2101, and accordingly, the description as to the same steps is not repeated here.

The processing by step S2101 is the processing of a classification similar to the processing by step S605 as shown in FIG. 6, however, it is different in that the information stored in the first exemplary embodiment is the information about the keyword to be deleted.

Just as described above in the first and the second exemplary embodiments, the data is stored in the storage area such as the database 110. Hereinafter, when the updating is performed by the search engine based on the data, the concerned search keyword is deleted.

The processing beyond step S2101 is the same as the processing in steps S605 and S606, and accordingly, the description thereto is not repeated here.

Figure 22:
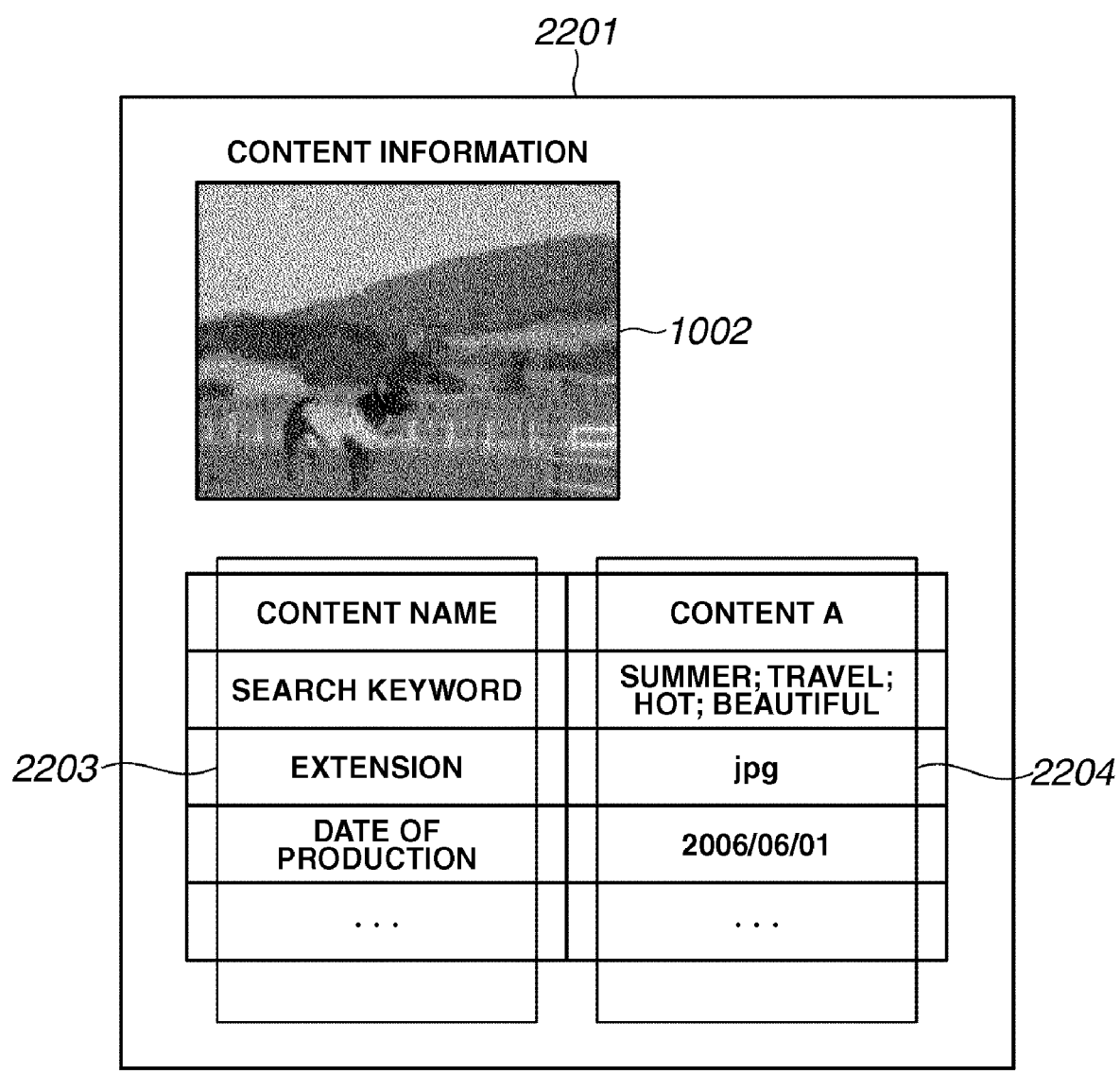
FIG. 22 illustrates one example of the data of a search result that is received from the search engine as shown in FIG. 3.

FIG. 22 illustrates one example of the data of a search result that is received from the search engine as shown in FIG. 3.

The data is classified similarly to the data acquired by step S404 as shown in FIG. 4, however, the content of the data is different from the data acquired in FIG. 4. The data as shown in FIG. 21 is an example of the data of the search result received from the search engine, and a web page displayed by the client PC can be produced based on the data, just as in FIG. 4.

Referring to FIG. 22, data 2201 is data that is received. The information in this example includes data 2004 that indicates the content hit by the search. The data 2204 is assumed to be actually handled information about a reference destination of a file, however, in this exemplary embodiment, the data is described as image data for easier understanding.

Data area 2203 is linked with the data 2204. The type of data included in the data area 2203 varies according to the system. In this example, the data area 2203 includes areas such as a "content name" area, a "search keyword" area, an "extension" area, and a "date of production" area. Data 2204 is actual data that corresponds to the data area 2203.

The data 2204 includes, as an example, "content A", "summer, travel, hot, beautiful", "jpg", and "2006/06/01".

That is, the data hit by the search has a content name "content A", an extension "jpg", and production date "2006/06/01", and that four search keywords "summer", "travel", "hot", and "beautiful" are used for the search.

Figure 23:
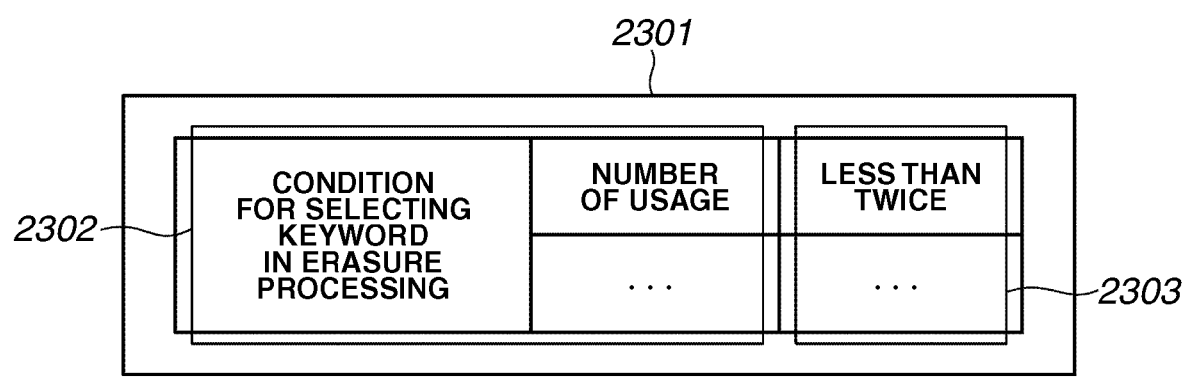
FIG. 23 illustrates one example of the data stored in the storage medium in the web APS as shown in FIG. 1.

FIG. 23 illustrates one example of the data stored in the storage medium in the web APS 109 as shown in FIG. 1. In this example, the data is acquired by step S1701 as shown in FIG. 21, and is stored in the storage medium in the web APS 109.

Referring to FIG. 23, data 2301 is data that is received. The information in this example includes a keyword selection condition area 2302 in the deleting processing.

In this exemplary embodiment, the keyword is updated for the deleting processing, unlike the first and the second exemplary embodiments. The selection condition is further divided, and includes information "number of usage".

Data 2303 includes a value "less than twice" for the selection condition area 2302. That is, the keyword selection condition is such that the "number of usage" of the keyword is "less than twice".

FIG. 24 illustrates one example of the search result of the operation history that is received from the operation history engine 306 as shown in FIG. 3. In this exemplary embodiment, the data is classified similar to the data in the example as shown in FIG. 19, however, the history of the acquired data differs from FIG. 19. Similar to FIG. 19, the data is the search result about the operation history that is received from the operation history engine 306 and is stored in the storage medium in the web APS 109.

Referring to FIG. 24, search result data 2401 includes an area 2402 that indicates an item number of the search result. In this example, five pieces of data 2403-2407 that indicate operation history are found by the search. The result of the search about the operation history differs as per each operation history, however, the present invention can be applied regardless of the operation history engine that is used.

The data 2403 indicates first search result and shows that "content A was searched on July 1 using "travel" and "summer" as the search keyword". The data 2404 indicates second search result and shows that "content A was searched on July 2 using "travel" and "sea" as the search keyword".

The data 2405 indicates third search result and shows that "content A was searched on July 10 using "summer" and "sea" as the search keyword". The data 2406 indicates fourth search result data and shows that "content A was searched on July 11 using "travel", "summer", and "beautiful" as the search keyword". The data 2407 indicates fifth search result and shows that "content A was searched on July 12 using "summer" and "sea" as the search keyword".

By using the data, the data acquired by step S602 in FIG. 21 is shown as described in FIG. 25.

FIG. 25 illustrates one example of the data stored in the storage medium in the web APS 109 as shown in FIG. 1. In this exemplary embodiment, the data acquired by step S602 in FIG. 21 indicates only necessary information extracted from the data 1901 as shown in FIG. 24. The data is stored in the storage medium in the web APS 109.

Referring to FIG. 25, data 2501 is data that is received. Data 2502 indicates an item number of the used search keyword. Data 2503 indicates a used keyword for searching the operation history. In this example, four keywords, namely, "travel", "summer", "sea", and "beautiful" are used. Data 2504 indicates a number of usages of the used search keyword. When the number of usage 2504 and the search keyword 2503 are set to each other, "travel" has been used "three times", "summer" "three times", "sea" "three times", and "western Japan" "once".

In step S1702 in FIG. 21, the determination is made using the search keyword 1303 in FIG. 13, the data 2204 as shown in FIG. 22, the "number of times used" 2504 in FIG. 25, and the value 2303 in FIG. 23. However, the data 1301 is described considering the result of the current search, and the processing in step S1702 is not necessary in finding unnecessary keyword in the content A without performing the search.

As can be seen from the data 2204, four keywords, namely, "summer", "travel", "hot", and "beautiful" are already registered to the content A.

Referring to the "number of times used" 2504, the keywords acquired from the history are "summer", "travel", "hot", and "beautiful". Here, "sea" is not registered, and accordingly, "sea" is omitted from the selected keywords. Next, because the selection condition indicated by the value 2303 is "less than twice", "travel" and "summer", which are used more than twice, are omitted.

Accordingly, "beautiful" is the keyword to be deleted. In addition, "hot", which is the registered keyword, is not shown in the history. The number of usage of "hot" is "zero", and accordingly, "hot" satisfies the condition "less than twice", and thus "hot" is also selected as the keyword to be deleted.

Figure 26:
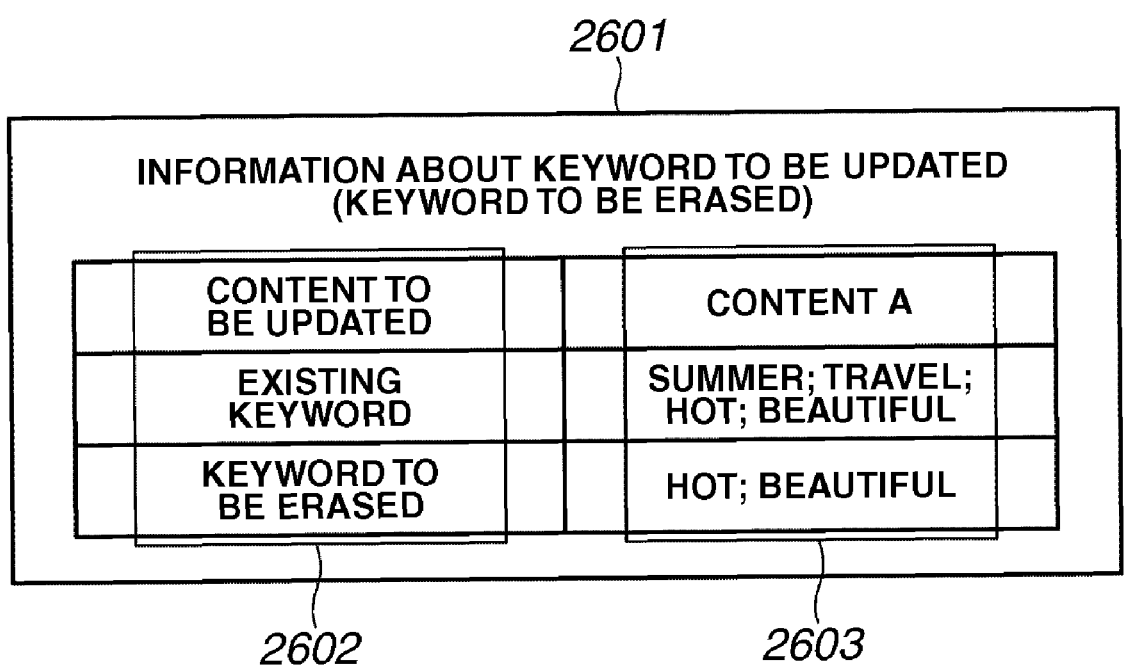
FIG. 26 illustrates one example of the data stored in the storage medium in the web APS as shown in FIG. 1.

FIG. 26 illustrates one example of the data that is stored in the storage medium in the web APS 109 as shown in FIG. 1. In this example, the data is produced and retained in step S2106 as shown in FIG. 21 and is stored in the storage medium in the web APS 109. Referring to FIG. 26, data 2601 is shown. An area 2602 indicates a category of each data, and includes an area for the content to be updated, an existing keyword area, and an area for the keyword to be deleted. Data 2603 is data that corresponds to the area 2602 and includes, for example, "content A" and "summer, travel, hot, and beautiful".

That is, the content to be updated is "content A", the existing keywords that the content A includes are "summer, travel, hot, and beautiful", and the keywords to be deleted from the content A are "hot" and "beautiful".

The keywords "hot" and "beautiful" are acquired based on the search history (operation history) within the time period specified as a condition. The acquired keywords to be deleted are the ones whose number of usage is small.

In a conventional technique, the determination processing is not included. Accordingly, a keyword remains effective once the keyword is set, and thus an inappropriate keyword undesirably remains.

The information produced in a manner as shown in FIG. 26 is acquired by step S701 in FIG. 7, and then in step S703, the search engine 304 performs the processing for updating (deleting) the search keyword. The processing performed thereafter is the same as the first exemplary embodiment, and accordingly, the description thereto is not repeated here.

As described above, in the third exemplary embodiment, in addition to the configuration of the first and the second embodiments, the keyword to be deleted is selected and the keyword updating is performed in which the keywords linked to the content are updated to be more appropriate.

According to the third exemplary embodiment, the updating is performed in which whether the keyword linked to the content is appropriate, is determined based on the operation history so as to delete an unnecessary keyword. Accordingly, an accumulation of unnecessary keywords can be suppressed to a minimum and a memory area can be freed up.

Fourth Exemplary Embodiment

In each of the exemplary embodiments described above, an example is described in which the database is locally connected to the web APS 109.

However, the present invention can also be applied to a system that uses a storage device such as a LAN disk apparatus directly connected on the LAN 107 as a database that stores the content.

Fifth Exemplary Embodiment

In each of the exemplary embodiments described above, an example is described in which the database 110 includes one database 110.

However, the present invention can be applied to a case where a storage system is configured considering a backup of the database 110. For example, the present invention can be applied to a system in which a plurality of hard disk devices are mirrored and managed. In this exemplary embodiment, the keyword is updated at a specific timing in updating the keyword for searching the content stored in one hard disk device.

Sixth Exemplary Embodiment

Hereinbelow, a configuration of a data processing program that the server of the present invention can read is described, with reference to a memory map as shown in FIG. 27.

FIG. 27 illustrates a memory map of a storage medium that stores various data processing programs that the server of the present invention can read.

Although not shown in FIG. 27, information for managing the programs stored in the storage medium such as version information and information concerning the creator of a program, for example, can also be stored. In addition, information that depends on the OS of the device that reads out the program, such as an icon for identifying and displaying the program, can also be stored.

Further, data that is subordinate to the various types of programs is also managed in a directory. In addition, a program for installing the various types of programs on a computer can be stored. In the case where a program to be installed is compressed, a program for decompressing the compressed program can also be stored.

The functions according to the above-described exemplary embodiments shown in FIGS. 4 through 7, FIG. 17, and FIG. 21 can be implemented by a host computer using a program installed from the outside of a device. In this case, the present invention is applied where a group of information including the program is supplied to an output device from a storage medium such as a CD-ROM, a flash memory, a floppy disk or from an external storage medium through a network.

As described above, the present invention can also be achieved by providing a system or a device with a storage medium storing program code of software implementing the functions of the embodiments and by reading and executing the program code stored in the storage medium with a computer of the system or the device (a CPU or an micro-processing unit (MPU)).

In this case, the program code itself, which is read from the storage medium, implements the functions of the embodiments described above.

Accordingly, the program can be configured in any form, such as object code, a program executed by an interpreter, and script data supplied to an operating system (OS).

As the storage medium for supplying such program code, for example, a flexible disk, a hard disk, an optical disk, a magneto-optical (MO) disk, a compact disk—read-only memory (CD-ROM), a CD-recordable (CD-R), a CD-rewritable (CD-RW), a magnetic tape, a nonvolatile memory card, a ROM, and a DVD can be used.

In this case, the program code itself, which is read from the storage medium, implements the function of the embodiments mentioned above.

The above program can also be supplied by connecting to a web site on the Internet by using a browser of a client computer and downloading the program itself or a compressed file that includes an automatic installation function, from the web site to a storage medium such as a hard disk. The functions of the above embodiments can also be implemented by dividing the program code into a plurality of files and downloading each divided file from different web sites. That is, a world wide web (WWW) server can be used for allowing a plurality of users to download the program file for implementing the function and processing of the invention.

Further, the above program can also be supplied by distributing a storage medium such as a CD-ROM that stores the program according to the present invention after performing encryption. A user who satisfies a prescribed condition is allowed to download a key for decoding the encryption from the web site via the Internet. The encrypted program code can be executed and installed in the computer by using the key information.

In addition, the functions according to the embodiments described above can be implemented not only by executing the program code read by the computer, but also by the processing in which an OS (operating system) or the like carries out a part of or all of the actual processing based on an instruction given by the program code.

Further, the program code read from the storage medium can be written in a memory provided in a function expansion board inserted in a computer or a function expansion unit connected to the computer. A CPU and the like provided in the function expansion board or the function expansion unit carries out a part of or all of the processing to implement the functions of the embodiments described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2005-328483 filed Nov. 14, 2005, which is hereby incorporated by reference herein in its entirety.

What is claimed is:

1. An information processing apparatus that searches a storage that stores contents associated with keywords, the information processing apparatus comprising:

a searching unit configured to perform a search process for searching a desired content from the contents that are stored in the storage based on an input search keyword;

a storing unit configured to store a search history of previous search processes that have been performed by the searching unit;

a history acquiring unit configured to acquire keywords being stored as the search history of the desired content in the storing unit;

a condition setting unit configured to set a condition for updating the keyword stored with the contents, the condition including a predetermined number of usage and a maximum number of characters;

a determining unit configured to determine, when there is the same keyword as a search keyword input at a new search process performed by the searching unit among the keywords acquired by the history acquiring unit, whether the same keyword satisfies the set condition by judging whether a number of usage of the same keyword is more than the predetermined number of usage and whether a number of characters of the same keyword is equal or less than the maximum number of characters; and an updating unit configured to update the keyword associated with the desired content that is stored in the storage by adding the same keyword used in the new search to the desired content if the determining unit determines that the same keyword satisfies the set condition, wherein the updating unit does not add the keyword used in the new search to the desired content if the determining unit determines that the same keyword does not satisfy the set condition.

2. The information processing apparatus according to claim 1, further comprising:

a communication unit configured to communicate with a client apparatus via a network, wherein the input search keyword is the keyword input by the client apparatus via the communication unit.

3. An information processing method executed by an information processing apparatus that comprises storage that stores contents associated with keywords, the information processing method comprising steps of:

performing a search process for searching a desired content from the contents that are stored in the storage based on an input search keyword;

storing a search history of previous search processes that have been performed in the searching step;

acquiring keywords being stored as the search history of the desired content in the storing step;

setting a condition for updating the keyword stored with the contents, the condition including a predetermined number of usage and a maximum number of characters;

determining, when there is the same keyword as a search keyword input at a new search process performed in the searching step among the keywords acquired from the search history of the desired content, whether the same keyword satisfies the set condition by judging whether a number of usage of the same keyword is more than the predetermined number of usage and whether a number of characters of the same keyword is equal or less than the maximum number of characters; and updating the keyword associated with the desired content that is stored in the storage by adding the same keyword used in the new search to the desired content if it is determined in the determining step that the same keyword satisfies the set condition, wherein the keyword used in the new search is not added to the desired content in the updating step if it is determined in the determining step that the same keyword does not satisfy the set condition.

4. The information processing method according to claim 3, further comprising a step of communicating with a client apparatus via a network, wherein the input search keyword is the keyword input by the client apparatus.

5. A computer-readable storage medium that stores a computer program, wherein the computer program causes a computer to execute steps of:

performing a search process for searching content in a storage that stores contents with keywords, based on an input search keyword;

storing a search history of previous search processes that have been performed in the search step;

acquiring keywords being stored as the search history of the desired content in the storing step;

setting a condition for updating the keyword stored with the contents, the condition including a predetermined number of usage and a maximum number of characters;

determining, when there is the same keyword as a search keyword input at a new search process performed in the searching step among the keywords acquired from the search history of the desired content, whether the same keyword satisfies the set condition by judging whether a number of usage of the same keyword is more than the predetermined number of usage and whether a number of characters of the same keyword is equal or less than the maximum number of characters; and updating the keyword associated with the desired content that is stored in the storage by adding the same keyword used in the new search to the desired content if it is determined in the determining step that the same keyword satisfies the set condition, wherein the keyword used in the new search is not added to the desired content in the updating step if it is determined in the determining step that the same keyword does not satisfy the set condition.

* * * * *